(12) United States Patent
Ebenstein et al.

(10) Patent No.: US 9,053,149 B2
(45) Date of Patent: Jun. 9, 2015

(54) METHOD AND SYSTEM TO PROVIDE COMPOSITE VIEW OF COMPONENTS

(75) Inventors: Hillary Ebenstein, San Francisco, CA (US); Giles Goodwin, San Francisco, CA (US); George Penston, Alameda, CA (US); Gregory Guttmann, San Francisco, CA (US); David MacLeod, Oakland, CA (US); Jeff Althoff, Oakland, CA (US)

(73) Assignee: Open Text S.A., Luxembourg (LU)

( * ) Notice: Subject to any disclaimer, the term of this patent is extended or adjusted under 35 U.S.C. 154(b) by 1009 days.

(21) Appl. No.: 11/021,588

(22) Filed: Dec. 22, 2004

(65) Prior Publication Data

US 2014/0201190 A1    Jul. 17, 2014

Related U.S. Application Data

(60) Provisional application No. 60/532,236, filed on Dec. 23, 2003, provisional application No. 60/532,092, filed on Dec. 23, 2003.

(51) Int. Cl.
  *G06F 17/00* (2006.01)
  *G06F 17/30* (2006.01)

(52) U.S. Cl.
  CPC .... *G06F 17/30451* (2013.01); *G06F 17/30106* (2013.01); *G06F 17/30277* (2013.01)

(58) Field of Classification Search
  CPC ............ G06F 17/30277; G06F 17/246; G06F 17/30569; G06F 17/30451; G06F 17/30106
  USPC .................. 707/1, 100, 102, 101, 104.1, 6, 7; 715/715, 520, 515, 503, 509, 516, 209, 715/210, 212, 220, 243, 246, 253, 215; 705/1
  See application file for complete search history.

(56) References Cited

U.S. PATENT DOCUMENTS

| | | | | |
|---|---|---|---|---|
| 5,737,591 A | * | 4/1998 | Kaplan et al. | 707/1 |
| 5,761,674 A | * | 6/1998 | Ito | 707/104.1 |
| 5,799,318 A | * | 8/1998 | Cardinal et al. | 707/101 |
| 5,907,846 A | * | 5/1999 | Berner et al. | 707/103 R |
| 5,930,474 A | * | 7/1999 | Dunworth et al. | 709/217 |
| 6,026,390 A | * | 2/2000 | Ross et al. | 707/2 |
| 6,175,837 B1 | | 1/2001 | Sharma et al. | |
| 6,356,256 B1 | * | 3/2002 | Leftwich | 345/157 |
| 6,421,658 B1 | * | 7/2002 | Carey et al. | 707/2 |
| 6,457,009 B1 | * | 9/2002 | Bollay | 1/1 |
| 6,484,159 B1 | * | 11/2002 | Mumick et al. | 707/2 |
| 6,529,217 B1 | * | 3/2003 | Maguire et al. | 715/769 |

(Continued)

OTHER PUBLICATIONS

Priebe et al., Towards Integrative Enterprise Knowledge Portals, CIKM'03, Nov. 3-8, 2003, New Orleans, LA, pp. 216-223.

*Primary Examiner* — Scott Baderman
*Assistant Examiner* — Howard Cortes
(74) *Attorney, Agent, or Firm* — Sprinkle IP Law Group

(57) ABSTRACT

Systems and methods for defining a composite view and using the definition of the composite view to obtain, aggregate, analyze, and present data from a variety of data sources to a user. These systems and methods may allow for the definition of a visual framework to aggregate and display related data. This visual framework, or composite view, may in turn be composed of a master view and a set of subviews, each of which may display data collected from a particular data source according to a particular format. By interacting with the master view data from a variety of data sources can be displayed.

21 Claims, 35 Drawing Sheets

(56) References Cited

U.S. PATENT DOCUMENTS

| | | | |
|---|---|---|---|
| 6,529,900 B1* | 3/2003 | Patterson et al. | 1/1 |
| 6,609,123 B1* | 8/2003 | Cazemier et al. | 1/1 |
| 6,647,410 B1* | 11/2003 | Scimone et al. | 709/206 |
| 6,662,188 B1* | 12/2003 | Rasmussen et al. | 1/1 |
| 6,704,743 B1* | 3/2004 | Martin | 707/103 R |
| 6,718,336 B1* | 4/2004 | Saffer et al. | 707/102 |
| 6,738,077 B1* | 5/2004 | Wendker et al. | 715/744 |
| 6,826,727 B1 | 11/2004 | Mohr et al. | |
| 6,915,294 B1* | 7/2005 | Singh et al. | 707/3 |
| 6,925,477 B1* | 8/2005 | Champagne et al. | 707/203 |
| 6,995,768 B2* | 2/2006 | Jou et al. | 345/440 |
| 7,289,990 B2* | 10/2007 | Gupta | 707/7 |
| 7,418,431 B1 | 8/2008 | Nies et al. | |
| 7,574,423 B2* | 8/2009 | Dettinger et al. | 707/3 |
| 2002/0052954 A1 | 5/2002 | Polizzi et al. | |
| 2002/0118226 A1* | 8/2002 | Hough et al. | 345/764 |
| 2002/0133504 A1* | 9/2002 | Vlahos et al. | 707/104.1 |
| 2002/0156806 A1* | 10/2002 | Cox et al. | 707/501.1 |
| 2003/0078943 A1* | 4/2003 | McGeorge, Jr. | 707/200 |
| 2003/0088715 A1* | 5/2003 | Chaudhuri et al. | 709/330 |
| 2003/0135491 A1 | 7/2003 | Rowley | |
| 2003/0189595 A1* | 10/2003 | Beard | 345/764 |
| 2004/0139085 A1* | 7/2004 | Eryurek et al. | 707/100 |
| 2004/0181543 A1* | 9/2004 | Wu et al. | 707/102 |
| 2004/0193579 A1* | 9/2004 | Dettinger et al. | 707/3 |
| 2004/0201588 A1* | 10/2004 | Meanor et al. | 345/440 |
| 2005/0021541 A1 | 1/2005 | Rangadass et al. | |
| 2005/0050068 A1* | 3/2005 | Vaschillo et al. | 707/100 |
| 2005/0080802 A1* | 4/2005 | Cras et al. | 707/100 |
| 2005/0187794 A1* | 8/2005 | Kimak | 705/3 |
| 2005/0268244 A1* | 12/2005 | Vignet | 715/760 |
| 2006/0020586 A1 | 1/2006 | Prompt et al. | |
| 2006/0069693 A1* | 3/2006 | DelGaudio et al. | 707/101 |
| 2006/0136469 A1* | 6/2006 | Dettinger et al. | 707/102 |
| 2007/0239772 A1* | 10/2007 | Gupta | 707/102 |

* cited by examiner

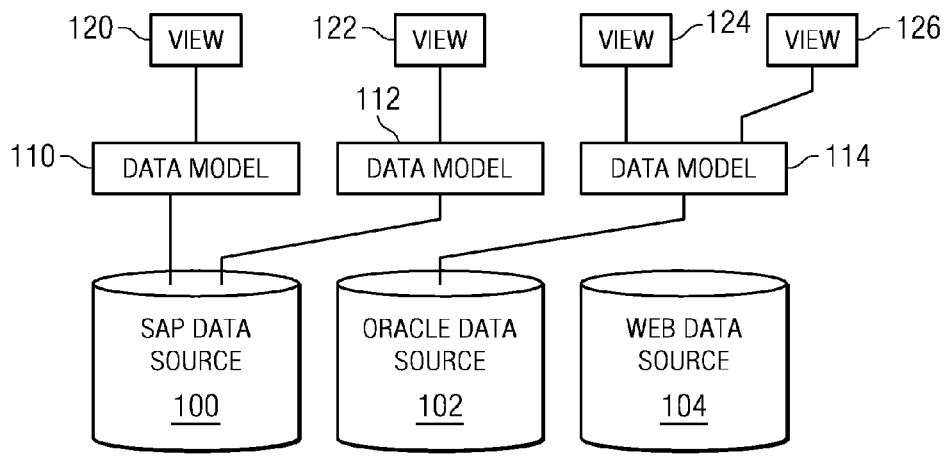
FIG. 1
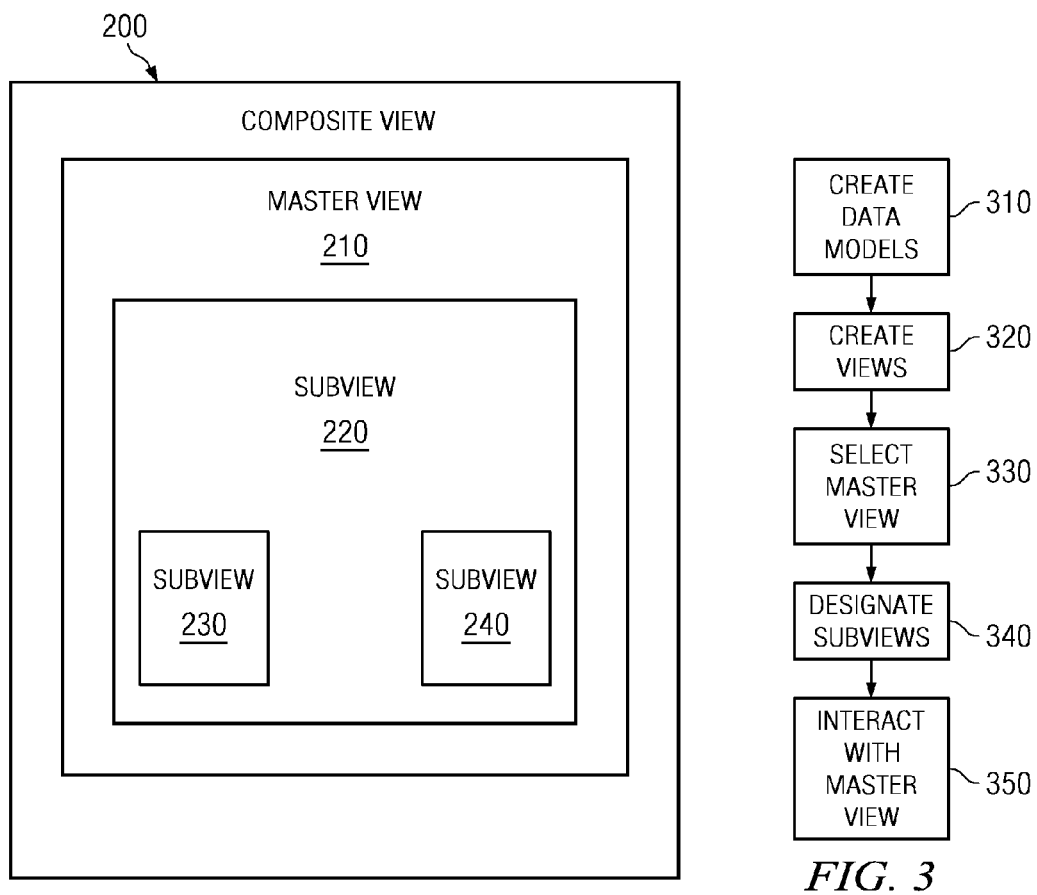
FIG. 2
FIG. 3

FIG. 8

Vignette Application Portal - Microsoft Internet Explorer

File  Edit  View  Favorites  Tools  Help | Links  My

Address: http://hqvapdemo1.vignette.com:71/portal/console/ctx_id.2e955e358da58a9dcd9f7a10f640d0a0...

VIGNETTE — APPLICATION PORTAL

Composite Application | Logged in as admin account | Switch Sites | Server Console | Logout ✓ Site is Enabled | Site View | Applications > AB Patent > Data Model: Kna1 Bapl Customer Getlist | Help Basics | Data Model Fields | Rules       Check In and Exit  [OK]

[Search] Show [100] < Prev [1-27] of 27 | Next >

Data Model Fields

A data model field represents either a column of a database table or a parameter of a method or operation. You can use these fields to construct views.

The data model, Kna1 Bapl Customer GetList, was successfully checked out. Create a new field or add an existing field using the commands below.

⊕ Define Field...  ⊕ Add Existing...  ╱1010  ◇ Variable  ✻Required  ⇥Input  ⇤Output  ⇆Input/Output

| Name | Description | Type | ◇ ✻ ⇥ ⓘ 🗑 |
|---|---|---|---|
| HIGH | Customer Number | Text | ⇥ⓘ🗑 |
| LOW | Customer number | Text | ⇥ⓘ🗑 |
| MAXROWS | Maximum number of customers | Number | ⇥ⓘ🗑 |
| OPTION | Selection: Operator, OPTION (as per Range Table) | Text | ⇥ⓘ🗑 |
| SIGN | Selection operator SIGN (as per range table) | Text | ⇥ⓘ🗑 |
| ACC_1_TIME | Indicator: is the account a one time account? | Text | ⇤ⓘ🗑 |
| CITY | City | Text | ⇤ⓘ🗑 |
| COUNTRY | Country key | Text | ⇤ⓘ🗑 |
| COUNTRY Iso | Country ISO code | Text | ⇤ⓘ🗑 |
| CUSTOMER | Customer number | Text | ⇤ⓘ🗑 |
| FAX_NUMBER | First fax no.: dialing code ÷ number | Text | ⇤ⓘ🗑 |
| ID | Message ID | Text | ⇤ⓘ🗑 |
| LOG_MSG_NO | Application log: message serial number | Text | ⇤ⓘ🗑 |
| LOG_NO | Application log: log number | Text | ⇤ⓘ🗑 |
| MESSAGE | Message text | Text | ⇤ⓘ🗑 |

1000

Left sidebar:
- Site Navigation
- Site Settings
- Components
- Sites
- Membership
- Delegated Administration
- Builder
  - Applications
  - Data Stores
  - Permissions
  - Consumers
- Content Administration
- Languages

SAP Customer Info - Microsoft Internet Explorer

File | Edit | View | Favorites | Tools | Help | Links | My

Address: http://hqvapdemo1.vignette.com:71/portal/site/composite/template.MAXIMIZE/meuitem.712ba18395a68a9dcd9  Go

Composite Application

Site Home | Site Colors | Administration
My Pages | My Account | Logout

You are logged in as admin account

[ SAP Customer Info ] [ Customer Orders ] [ Expenses ]

SAP Customer Info — 3500

SAP Customer List Portlet

| NAME | CUSTOMER | CITY | REGION | STREET | TEL1_NUMBR |
|---|---|---|---|---|---|
| Holbrook Industries | 0000000001 | AUSTIN | TX | 1234 ROLLINGWOOD DRIVE | 512-212-21212 |
| Acme Industries | 0000000002 | Boston | | 300 Main Street | 617-212-5555 ← 3510 |
| Scoops Manufacturing | 0000000003 | Waltham | MA | 200 Fourth Ave | |
| Petersen Manufacturing | 0000000004 | Boston | | 499 9th Street | |
| Boston Products | 0000000005 | Waltham | MA | 230 Third Ave | 1(781)487-2865 |
| Compu Tech | 0000004130 | San Francisco | | 10001 Bay Avenue | |

CustomerNo for Subview  0000000002

3640 →

3630

| NAME ▲ | AMOUNT | DATE1 | CUSTOMERNO |
|---|---|---|---|
| Services | 5,000 | Feb 1, 2004 12:00:00 AM | 0000000002 |
| Customer Visit | 1,500 | Mar 1, 2004 12:00:00 AM | 0000000002 |
| Joint Presentation | 2,000 | Apr 1, 2004 12:00:00 AM | 0000000002 |
| Air Travel | 500 | Feb 1, 2004 12:00:00 AM | 0000000002  3650 |

Sales chart: 12,500 / 10,000 / 7,500 / 5,000 / 2,500 / 0
■ PRODUCT  ■ SERVICES

*FIG. 37*

METHOD AND SYSTEM TO PROVIDE COMPOSITE VIEW OF COMPONENTS

RELATED APPLICATIONS

This application claims a benefit of priority under 35 U.S.C. §119 to U.S. Provisional Patent Application Ser. No. 60/532,236 by inventors Hillary Ebenstein, Giles Goodwin, George Penston, Gregory Guttman, David Macleod and Jeff Althoff, entitled "System and Method to Provide Composite Views of Components" filed on Dec. 23, 2003 and U.S. Provisional Patent Application Ser. No. 60/532,092 by inventors Mark Abramowitz, Hillary Ebenstein, Giles Goodwin, George Penston, David Macleod, Jeff Althoff, Grant Lee, Nathan Sequeira and Rob Abrazado entitled "Navigation System and Method Between Objects, Tables or Data Sources" filed on Dec. 23, 2003, the entire contents of which are hereby expressly incorporated by reference for all purposes.

TECHNICAL FIELD OF THE INVENTION

The invention relates in general to data management, and more particularly, to managing, aggregating and displaying data from disparate sources.

BACKGROUND OF THE INVENTION

As enterprises grow, the infrastructure that supports these enterprises usually grows at an exponential pace. Moreover, the data collected and utilized by these enterprises may grow at an even faster pace than the infrastructures themselves. This data may come from a wide variety of sources including improved instrumentation, automated enterprise business processes, individual productivity software and analytics. Improved instrumentation that captures digital rather than analog data has driven the growth of scientific, engineering, and production data. In business, data growth has come from the implementation of information technology (IT) systems that automate enterprise-level business processes such as enterprise resource planning and customer relationship management, and from individual productivity applications such as email and word processing. Additionally, after enterprises capture data, they generally want to use it to improve their business processes and outcomes. However, transforming this transactional data into a format suitable for analytics generates even more data and is also a major source of data growth.

Compounding the problem of data growth is the nature of how this data is stored. In many instances, this data resides in a wide and varied assortment of environments, subsystems and databases. Because of differences in these data repositories, coalescing this gathered data into meaningful sets of related data can be a daunting process, and presenting meaningful sets of data to a user may be well nigh impossible.

These difficulties stem not so much from the presence of a large number of data repositories, but from the varying formats for storing data that exist between these different data repositories. In general, to correlate sets of data between data repositories of different format, the data in each of these data repositories must be analyzed, and manually correlated.

For example, suppose sales data resides in an Oracle database, having a customer name and associated sales data; and address data resides in an SAP database having a customer name and an address associated with the customer name. Now suppose that the Oracle database refers to the customer name as "CUSNAME", while the field name for the customer name in the SAP database is "CUSTOMERNAME". In this case there would be no way to automatically relate the sales data and the address for a given customer, even given that the exact same customer name was stored in the "CUSNAME" field of the Oracle database and the "CUSTOMERNAME" field of the SAP database. This is because the formats and fields used to store the same data vary between data repositories.

Typically, relating data between data repositories is a manually intensive process. To continue with the above example, to obtain the sales data and address for a given customer, a person queries the Oracle database with the customer name in the "CUSNAME" field to obtain sales data for the customer and queries the SAP database with the customer name in the "CUSTOMERNAME" field to obtain the address of the customer. As can be seen from this small example, obtaining data from a wide variety of data repositories is a time consuming task. As can be imagined, coalescing and analyzing this data is an even more difficult task, and displaying the results of these data mining efforts more difficult still.

Thus, a need exists for methods and systems for mapping between various data repositories and using these mappings to obtain, correlate, analyze and display data from these data repositories.

SUMMARY OF THE INVENTION

Systems and methods for defining a composite view and using the definition of the composite view to obtain, aggregate, analyze, and present data from a variety of data sources to a user. These systems and methods may allow for the definition of a visual framework to aggregate and display related data. This visual framework, or composite view, may in turn be composed of a master view and a set of subviews, each of which may display data collected from a particular data source according to a particular format. Using the master view a user may indicate a criterion. Using this criterion, each of these subviews gathers data from the data source with which it is associated. Each subview then presents the acquired data in the composite view according to the definition of the subview. Thus, the composite view can present associated data from a variety of data sources based solely on the user's interaction with the master view.

In one embodiment, a criterion is determined from a selection in a master view and is passed from a master view to a set of subviews of the master view based on a mapping of a field in the master view to a field in each of the subviews. Each of the subviews can then be formed using data obtained from a data source using the criterion.

In another embodiment, a criterion is passed from a subview of the master view to its subviews based on a mapping of a field in the subview to a field in each of its subviews. Each of these subviews can then be formed using the criterion using data obtained from a data source using the criterion.

In yet another embodiment, the data sources may be in a variety of formats.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 1 includes an illustration of an embodiment of an architecture for implementing the present invention.

FIG. 2 includes a block diagram of an embodiment of a composite view.

FIG. 3 includes a flow diagram for one embodiment of creating a composite view.

FIGS. 4-12 include one embodiment of an interface for defining a data model.

FIGS. 14-19 include a representation of one embodiment of an interface for defining a view.

FIGS. 21-27 include a representation of an interface for editing a view, including defining subviews.

FIGS. 35-37 include a representation of one embodiment of interacting with a composite view.

DESCRIPTION OF PREFERRED EMBODIMENTS

Figure 4:
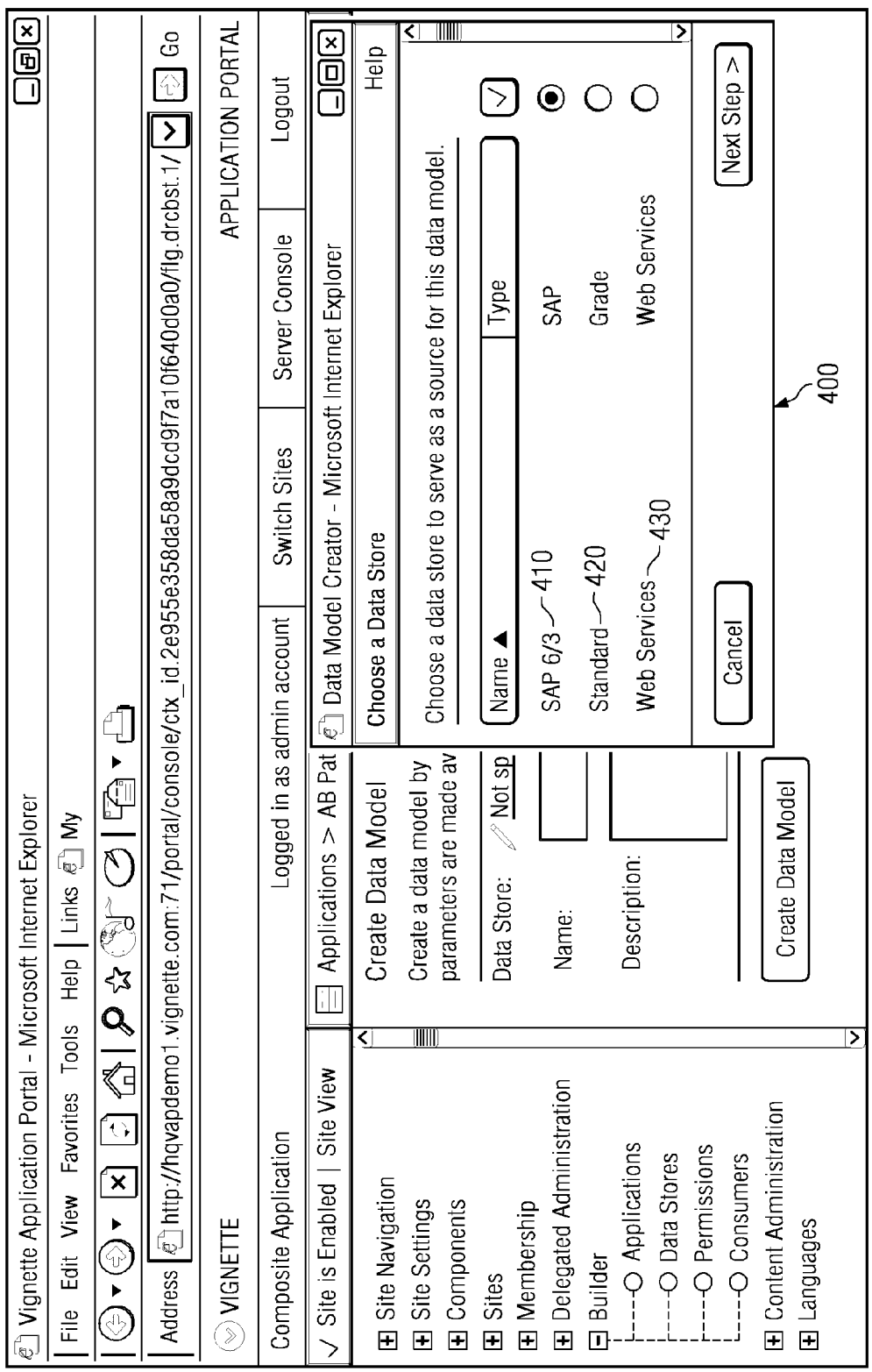

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification. The term "view" is intended to mean a visual framework or a definition for presenting data. This view may include a number of "subviews" which in themselves may be views. The term "subview" in this context is intended to mean a view defined with respect to another view. For example, if a view is defined to include a second view, the second view may be labeled a "subview" of the first view and the first view a "parent view" of the second view, however this second view may contain a third view, thus the third view would be a "subview" of the second view and the second view a "parent view" of the third view. A "composite view" is intended to mean any view (referred to as the "master view") that includes one or more subviews.

It will be apparent to those of ordinary skill in the art the recursive nature of this view/subview correlation and the nesting characteristics that accompany these correlations. Thus, if a first view includes a subview and this subview in turn contains two subviews, all three subviews may be displayed in conjunction with the display of the first view.

The term "data model" is intended to mean a set of data based on data from one or more data sources. This set of data may be obtained directly from a data source, may be the result of the application of one or more rules to data from the data source, may result from sending data from the data source to a web service and receiving a response which is contained in the data model, etc.

The term "data source" is intended to mean any type of repository for data, including databases and the like.

Attention is now directed to methods and systems for defining a composite view and using the definition of the composite view to obtain, aggregate, analyze, and present data from a variety of data sources to a user. These systems and methods may allow for the definition of a visual framework to aggregate and display related data. This visual framework, or composite view, may in turn be composed of a master view and a set of subviews, each of which may display data collected from a particular data source according to a particular format. Each of these views may be based on a data model, and the data model, in turn, based on a data source. Using the master view a user may indicate a criterion. Using this criterion, each of these subviews gathers data from the data model on which it is based, the data model having access to this information from the data source with which it is associated. Each subview then presents the acquired data in the composite view according to the definition of the subview. Thus, the composite view can present associated data from a variety of data sources based solely on the user's interaction with the master view.

In an illustrative embodiment of the invention, the computer-executable instructions may be lines of assembly code or compiled $C^{++}$, Java, or other language code. Other architectures may be used. Additionally, a computer program or its software components with such code may be embodied in more than one data processing system readable medium in more than one computer.

FIG. 1 includes a block diagram of an exemplary architecture for an embodiment of the present invention. Data sources 100, 102, 104 may be databases or any other type of repositories for data as are known in the art. For example, data source 100 may be a SAP database, data source 102 an Oracle database, and data source 104 may be a web service capable of returning data in response to an inquiry. Each of these data sources may store data according to a variety of fields as is known in the art.

Data models 110, 112, 114 are sets of data based on one or more data sources 100, 102, 104, and may consist of data taken directly from data sources 100, 102, 104, from rules applied to data taken from data sources 100, 102, 104 or any other way of manipulating data in data sources 100, 102, 104, such as sending data from data sources 100, 102, 104 to a web site, receiving data in return and including this returned data in the data model.

Data models 110, 112, 114 each contain a set of fields. Each of these fields corresponds directly to a field within the data source 100, 102, 104 on which data model 110, 112, 114 is based, or, is a new field defined during definition of data model 110, 112, 114. In the particular embodiment depicted, data models 110 and 112 may be based on data source 100 which is an SAP database, while data model 114 may be based on data source 102, an Oracle database. By using data models 110, 112, 114, information from varying data sources 100, 102, 104 may be represented and/or stored in a substantially similar format, regardless of the format of the underlying source of that data.

Views 120, 122, 124, 126 are based on data models 110, 112, 114 and define a visual framework for presenting data contained in the data model on which view 120, 122, 124, 126 is based. Views 120, 122, 124, 126 are usually displayed as a chart, a form, or a report. Charts graphically present data in the data model associated with the view, forms may display data and allow a view to contain other views and reports may present a set of the data in the associated data model in tabular format.

Views 120, 122, 124, 126 are based on a set of fields, each field within each view 120, 122, 124, 126 corresponding to a field in data model 110, 112, 114 on which view 120, 122, 124, 126 is based. One or more of these fields in each view 120, 122, 124, 126 can be designated as searchable by criterion, thus, a criterion can be presented to a view and the view can search the designated field for the criteria. If the criterion is found, data associated with that criterion is presented in the view. In the embodiment depicted, view 120 is based on data model 110, view 122 is based on data model 112, view 124 is based on data model 114 and view 126 is based on data model 114.

These views 120, 122, 124, 126 may be used to create a definition of a composite view designed to display a wide variety of associated data from diverse data sources to a user of the composite view. A block diagram of an exemplary definition for a composite view is illustrated in FIG. 2. Composite view 200 is comprised of a number of views 210, 220, 230, 240. These views 210, 220, 230, 240 may be linked together so that interaction with one of the views 210, 220, 230, 240 drives the display of data in the other views 210, 220, 230, 240.

Namely, in one embodiment, one of these views 210 is a master view, view 220 is a subview of master view 210, and views 230 and 240 are subviews of view 220. By interacting with master view 210, a user may alter the data displayed in each of the subviews 220, 230, 240. During definition of composite view 200 a field of master view 210 is mapped to a field of subview 220, with this field of subview 220 operable to be searched by a criterion. Similarly, during definition of subview 220, a field of subview 220 may be mapped to a field of subview 230 and a field of subview 240, with both the field of subview 230 and the field of subview 240 operable to be searched by a criterion. The fields in subviews 220, 230 and 240 may have been designated as searchable by a criterion during the definition of their respective subviews 220, 230, 240.

Thus, after composite view 200 is initially displayed to a user, the user of composite view 200 may drive the data displayed in views 220, 230, 240 through interaction with master view 210. Based on a selection in master view 210, a criterion associated with the selection in master view 210 can be used by subview 220 to obtain and display data corresponding to the criterion. By the same token, a criterion from subview 220 can be used by subviews 230 and 240 to obtain and display data corresponding to the criterion.

In most cases, the passing of a criterion between a view and a subview is done based on a mapping between the fields of the view and the subview, with the criterion being a value in the mapped field of the view. To continue with the above example, when a selection is made in master view 210 the field in master view 210 which is mapped to a field in subview 220 contains a certain value based on the selection made. This value may be used to search the mapped field in subview 220 for the value and to obtain and display data associated with the value. Similarly, when subview 220 is searched based on this value, the field in subview 220 which is mapped to a field in subview 230 contains a certain value based on the search, and the field in subview 220 which is mapped to a field in subview 240 contains a certain value based on the search. These values may be used to search the mapped fields in subviews 230 and 240 for the value, and to obtain and display data associated with the value.

In this manner the entire composite view 200 may be altered and changed based on interaction with master view 210. Additionally, master view 210 may be used to drive this change without any additional interaction with other views 220, 230, 240 which comprise composite view 200. This ability prevents a user from having to manually mine data sources to obtain desired and related data. Additionally, the use of mapping between fields in the views allows related data from different data sources to be displayed in the various views and subviews regardless of the underlying format of the data sources or data models on which the views are based.

It is important to note that all views 210, 220, 230, 240 displayed in composite view 200 exist independently of one another and independent of composite view 200 as well. The hierarchy and mappings depicted with respect to composite view 200 have been defined only with respect to composite view 200. In other words, other composite views may exist which utilize views 210, 220, 230, 240 or a subset of these views, and different arrangements and mappings in conjunction with these views 210, 220, 230, 240 may be utilized. For example, in one embodiment master view 210 may be view 120, subview 220 view 122, subview 230 view 124 and subview 240 view 126. In another embodiment of a similarly arranged composite view, master view 210 may be view 126, subview 220 view 120, subview 230 view 122 and subview 240 view 124.

Turning now to FIG. 3, a flow diagram for one embodiment of a process for forming a composite view is depicted. This process may be facilitated by the use of a visually based navigation application which will be utilized in conjunction with the various steps of FIG. 3 to aid in illustrating the process. A set of data models may be created from a set of data sources (STEP 310) and views may be created based on the set of data models (STEP 320). One of these views may be used as a master view (STEP 330) while other of these views may be designated as subviews of the master view (STEP 340). The composite view can then be displayed to a user and interacted with (STEP 350).

To create a composite view, in one embodiment, the first step is to create a set of data models (STEP 310). In many cases these data models are based on one or more of the data sources from which it is desired to extract data, usually with a data model being based on a single data source. By the same token, however, multiple data models may be based on a single data source. The fields contained by a data model may be a superset of fields contained in a data source, and each of these fields in a data model corresponds directly to a field within the data source on which the data model is based or is a new field defined during definition of this data model. A graphical application may be used, in one embodiment, to assist a user in defining data models for various data sources.

FIGS. 4-12 depict an embodiment of defining a data model using just such a graphical application. After a user decides to create a data model, a user is presented with a set of data sources. FIG. 4 depicts a selection screen designed to facilitate the selection of a data source on which to base a data model. A user creating a data model is presented with screen 400 displaying the names and types of data sources 410, 420, 430. Notice that in FIG. 4, data source 410, a data source of type SAP has been selected.

Once a data source has been selected, the user may be presented with a series of screens to select fields from that data source for the data model. This may involve navigating through a series of screens depicting the hierarchies, functions, methods, tables, fields etc. of the data source selected. FIGS. 5-8 depict a series of screens for one embodiment of this process for the selected SAP data source 410.

Figure 5:
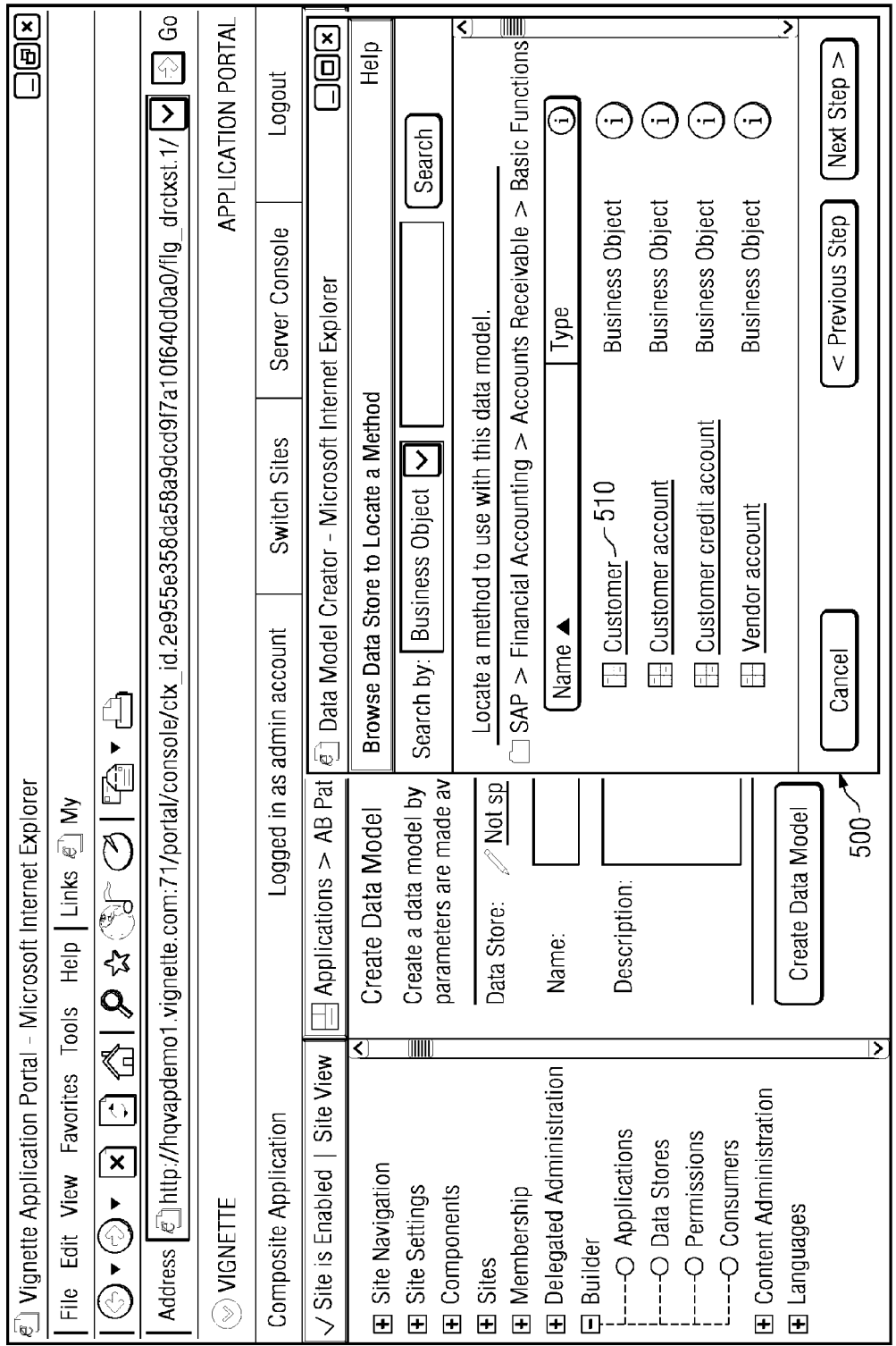
Figure 6:
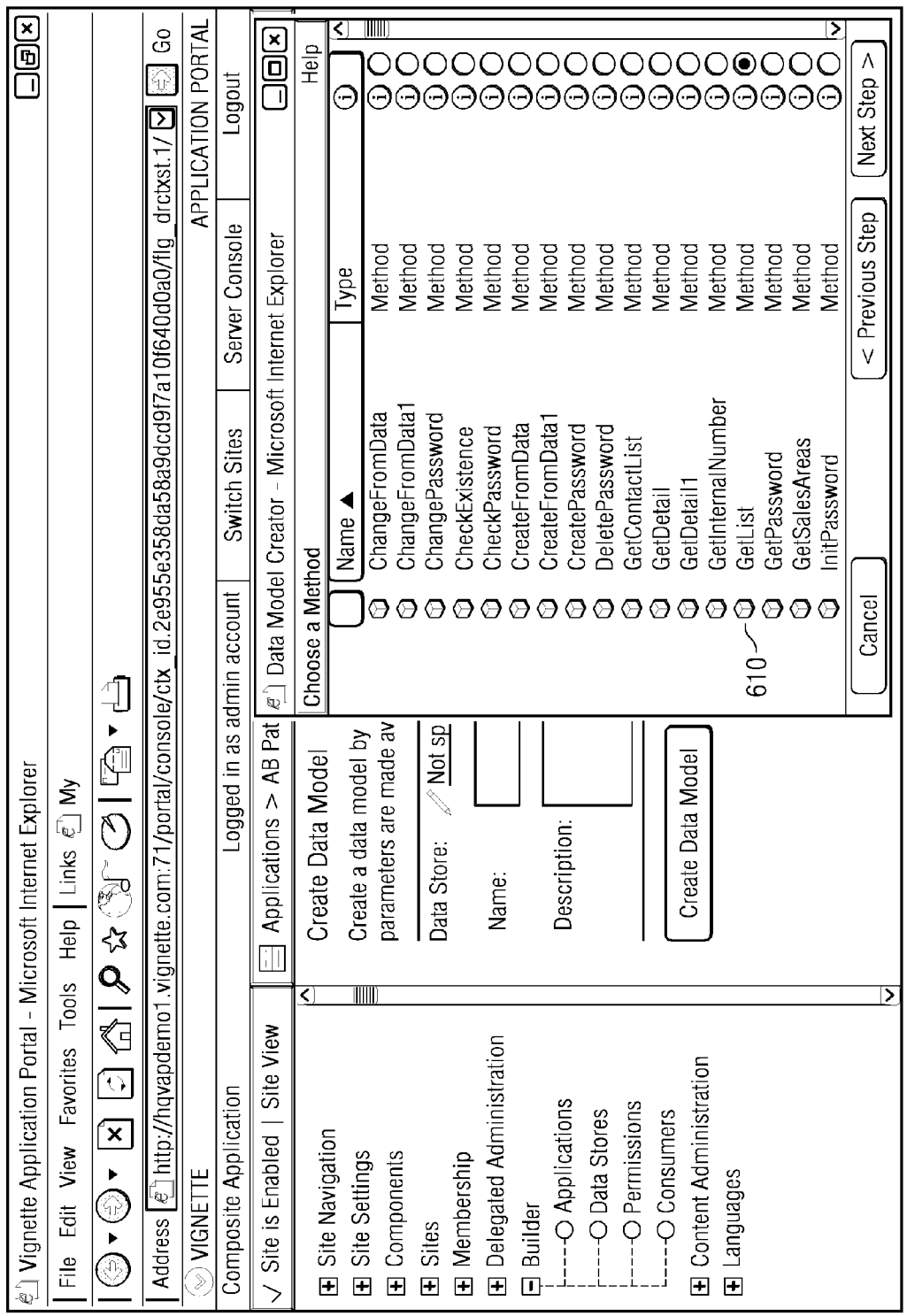

FIG. 5 depicts screen 500, displaying a list of basic functions associated with SAP data source 410. The user may select one of these basic functions, for example customer function 510. Based on the function selected in screen 500, a screen is presented to the user displaying the lists of methods associated with the selected function. FIG. 6 depicts a screen displaying a list of methods associated with customer function 510 to a user. Notice that the user has selected function 610, the "GetList" method in the screen depicted in FIG. 6.

Figure 7:
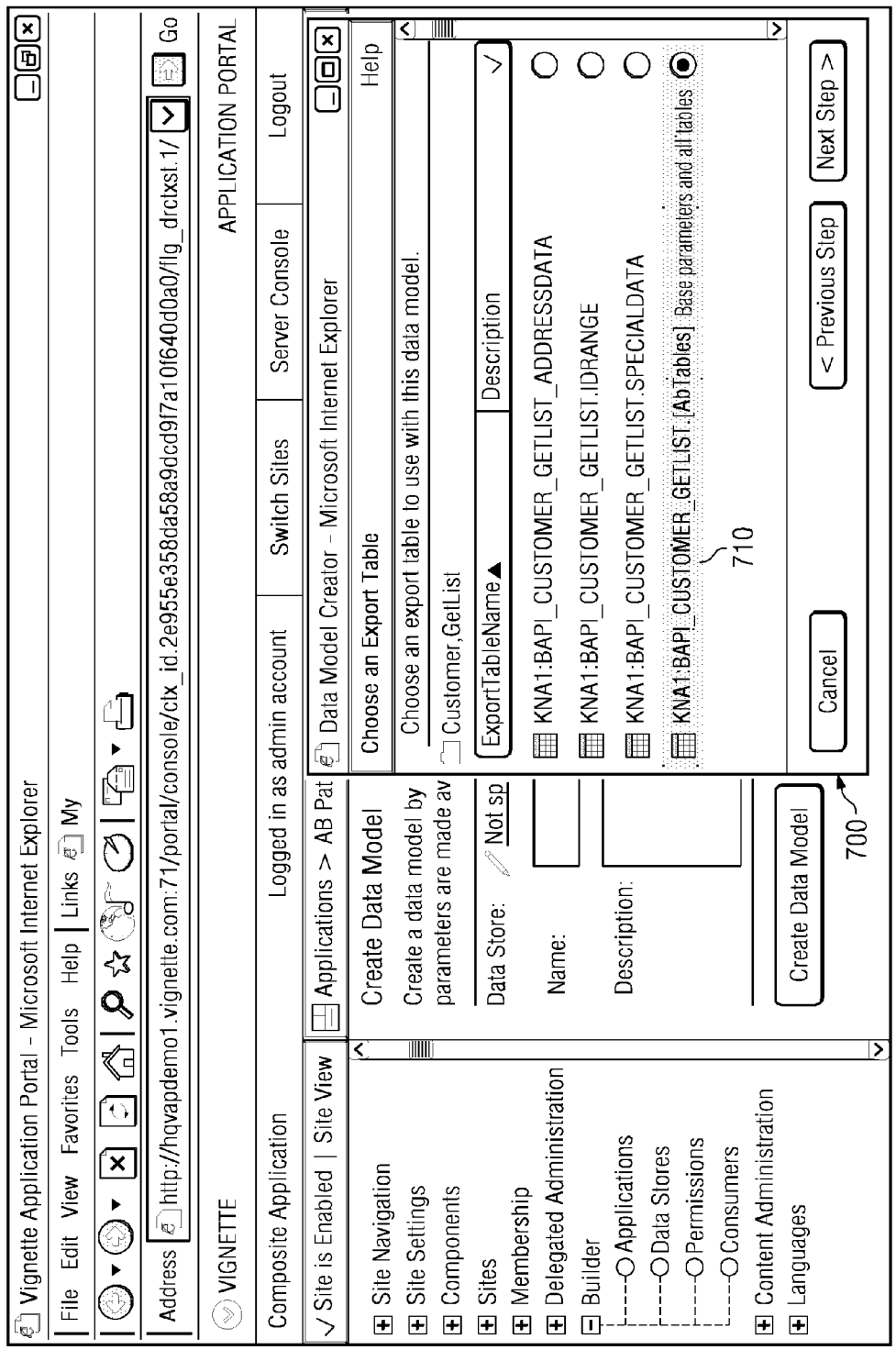

Selecting the "GetList" function 610, can result in the screen depicted in FIG. 7. Screen 700 presents to the user a list of tables associated with "GetList" function 610, from which the user can select one or more tables to be used in conjunction with the data model being created. Here, in screen 700, the user has selected the table 710, or business object, "KNA1:BAPI_CUSTOMER_GETLIST[All Tables]", meaning that fields contained in all the tables pertaining to a customer will be returned to the user.

Figure 8:
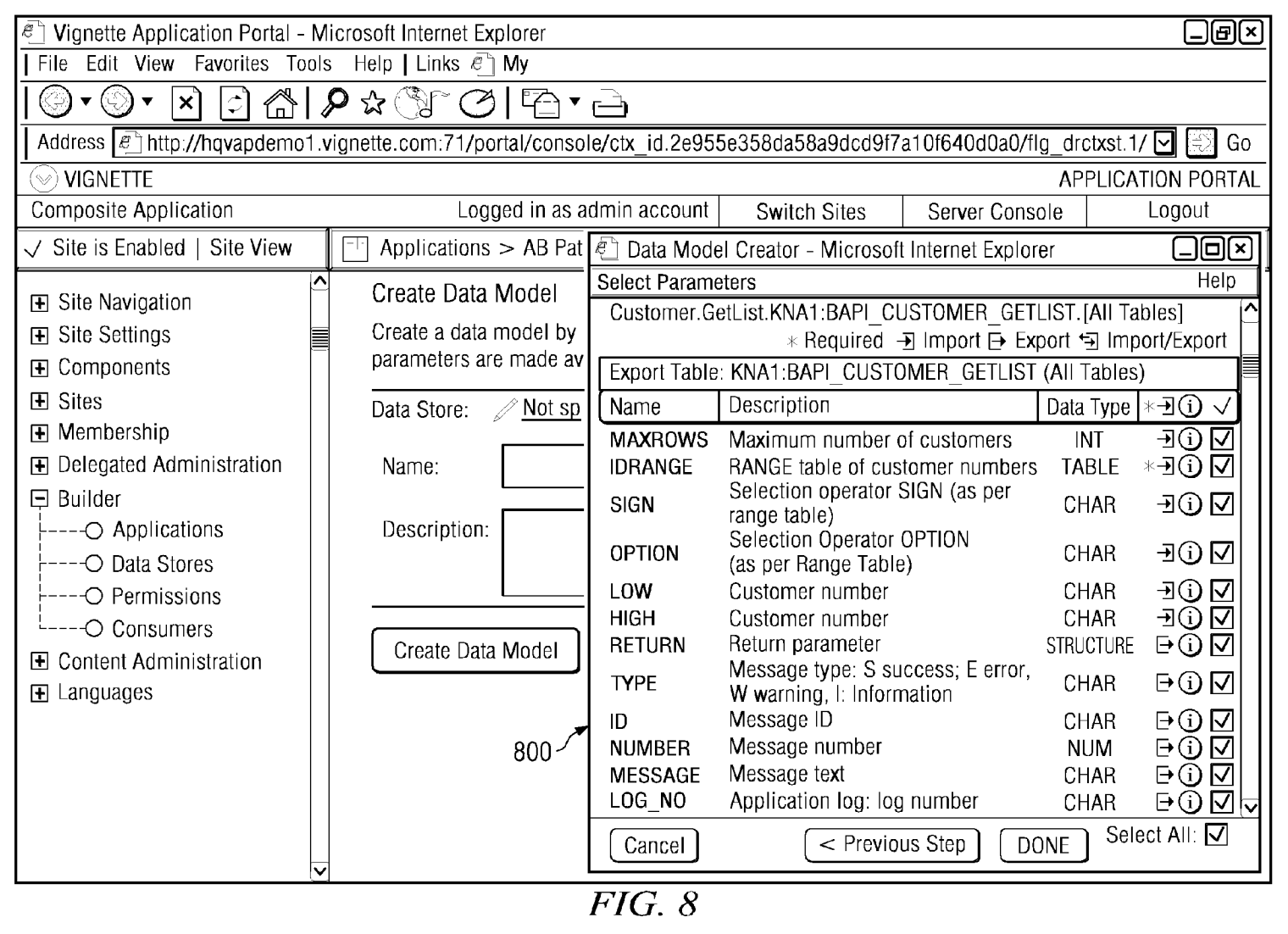

These fields are returned to the user in a screen like that depicted in FIG. 8. Screen 800 displays a list of fields to the user (not all of which are shown) associated with selected table 710. From this list the user may select a set of fields to be used in the data model being created. Notice that in screen 800, the user has selected all of the displayed fields (denoted by the check mark in the box corresponding to the field name).

Figure 9:
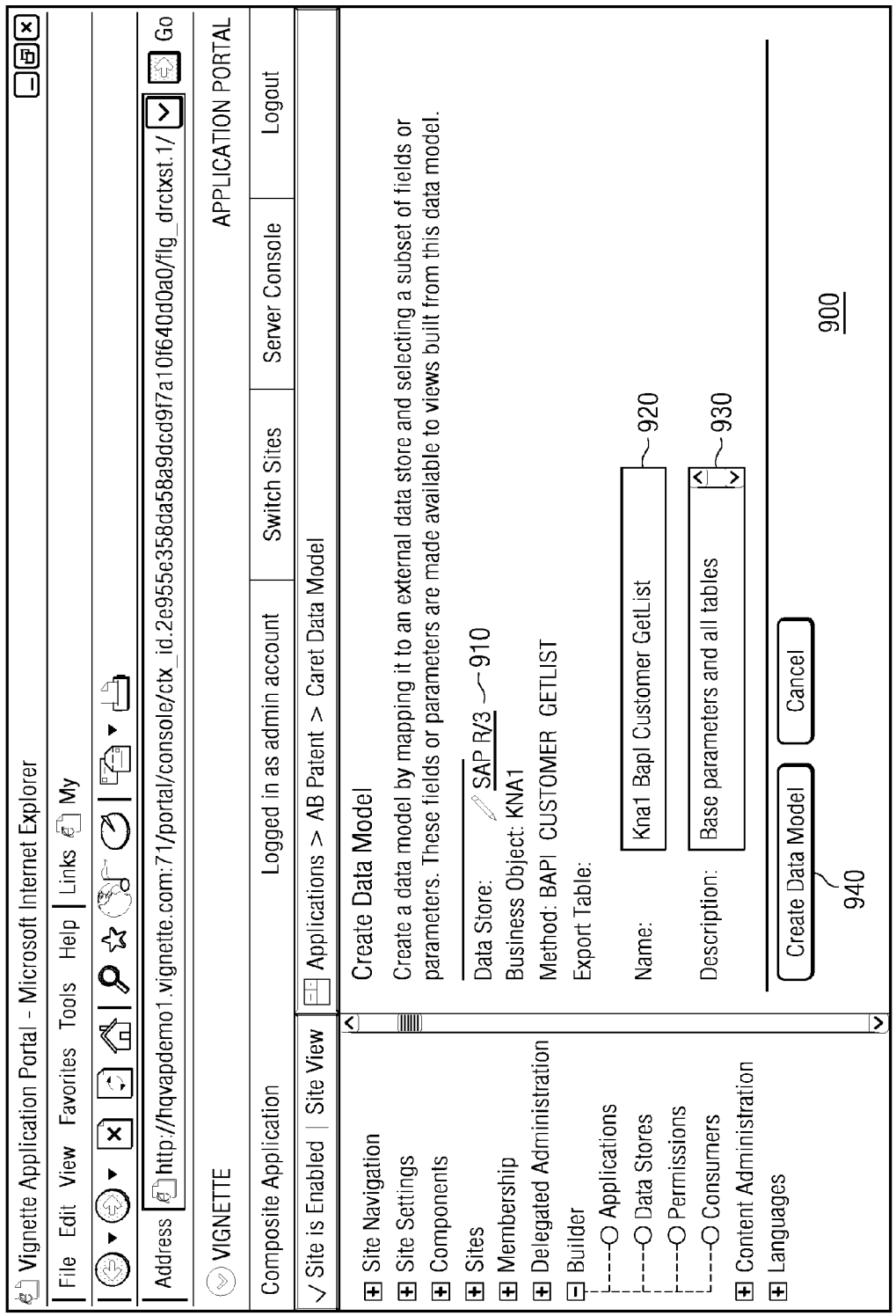

Once the user has selected a set of fields to be associated with a data model, the user may be presented with a screen like that depicted in FIG. 9, to confirm the creation of the data model. Screen 900 presents to the user the data store 910 on which the data model is to be based, and presents a field 920 for the user to complete with a name of the data model to be created, and a field 930 which the user may use to describe the data model. Notice the user has completed field 920 with a name for the data model, and field 920 with a description. The user can then create the data model by selecting button 940.

After the data model is created, the user may be presented with a screen such as that depicted in FIG. 10. Screen 1000 confirms the data model has been created, and displays the current fields in the data model. At any point thereafter the user may create a field and add this field to the fields of the data model. In one embodiment, this may be done by selecting icon 1010 indicating the user would like to add a field to the existing data model. Selecting icon 1010 results in a screen which enables the user to add a field.

Figure 11:
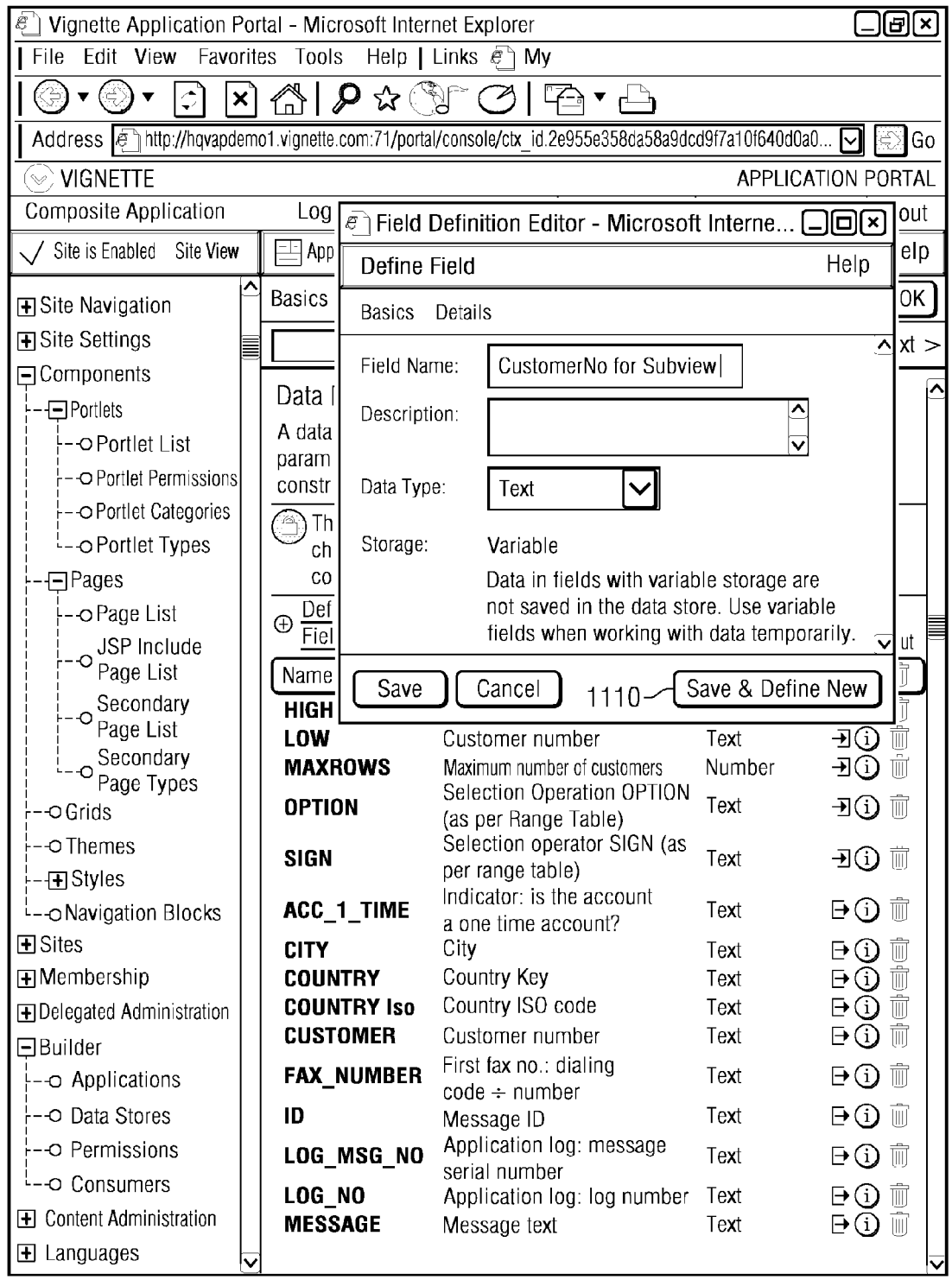

An embodiment of this screen is depicted in FIG. 11. Screen 1100 allows the user to create a field by entering the name of the new field and selecting the data type to be contained in the field. Notice that here the user has named the newly added field "CustomerNo for Subview" and has designated that this field will contain text. The new field can then be created when the user selects the "Save & Define New" button 1110. The presence of the data model is then indicated in a screen which depicts the various defined components.

Figure 12:
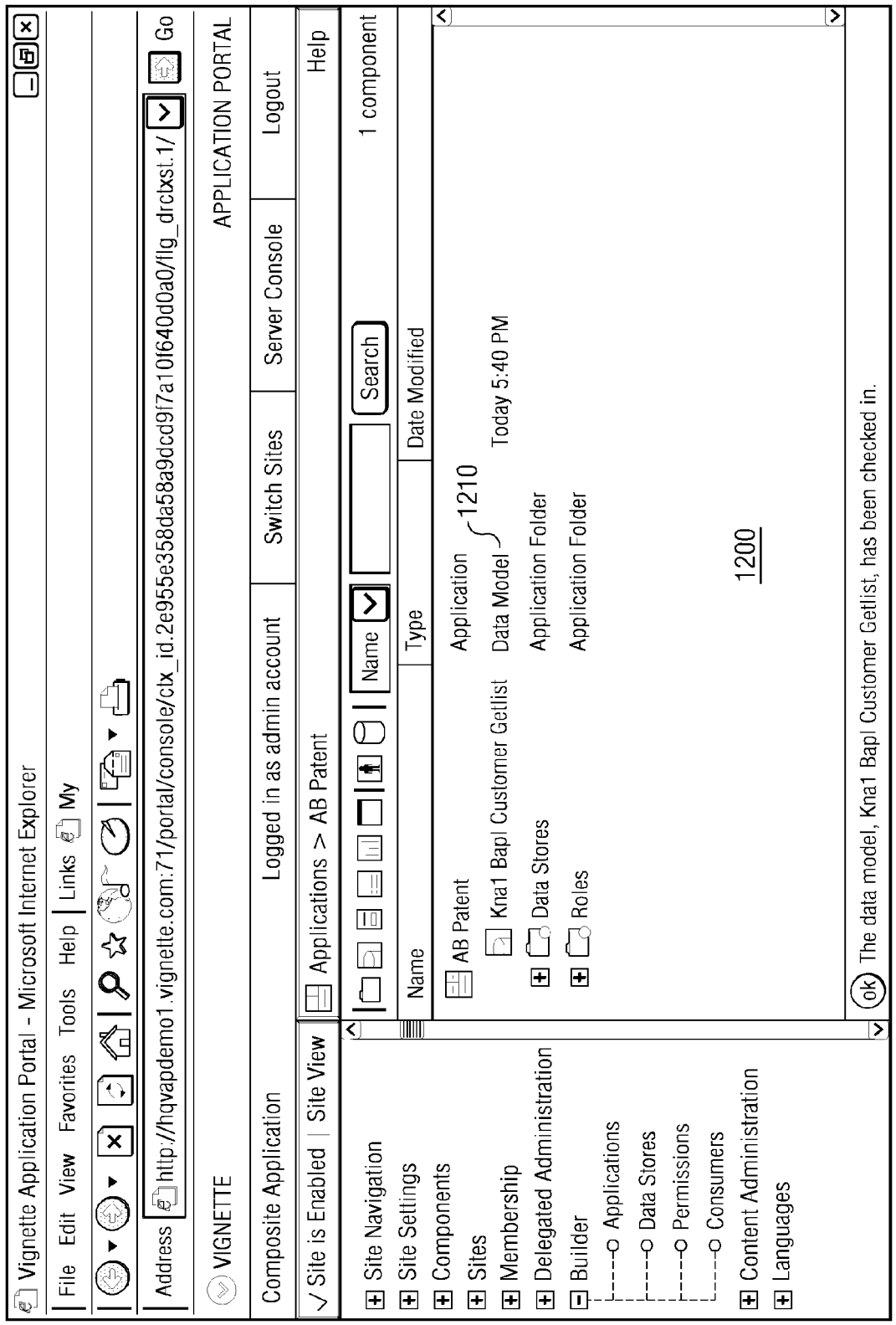

One embodiment of a screen of this type is shown in FIG. 12. Screen 1200 shows newly defined data model "Kna1 Bapi Customer GetList" 1210.

Figure 13:
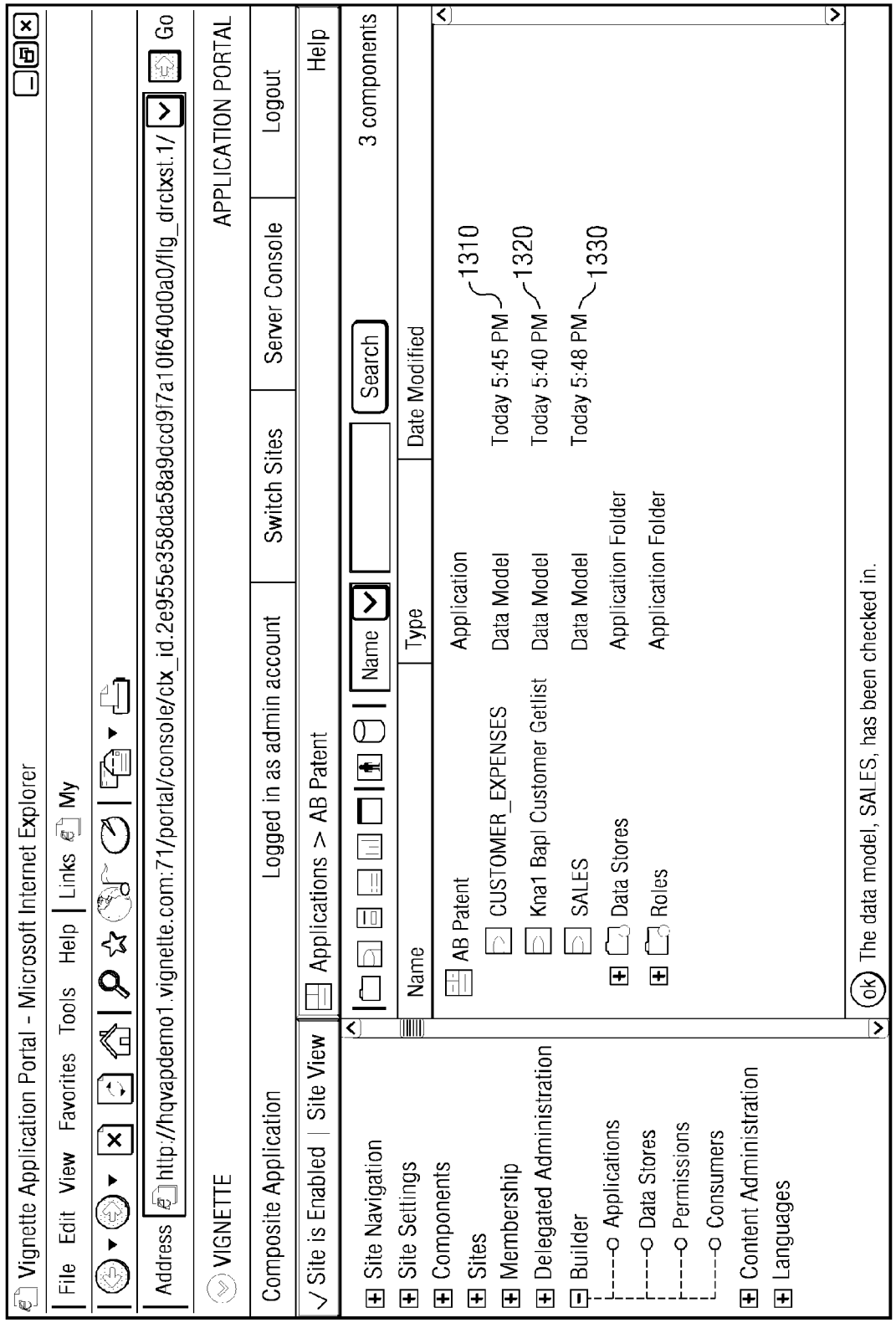
FIG. 13 includes a representation of one embodiment of an interface for displaying defined components.

It will be apparent to those of skill in the art that many data models may be created from a variety of data sources, and screens tailored to each type of data source may be presented to a user to aid in the creation of a data model from that data source. Additional created data models may be displayed in the same way as data model 1210. FIG. 13 depicts another example of a screen for displaying defined components. In this case data model 1310 named "CUSTOMER_EXPENSES" has been defined from an SAP based data source, while data model 1320 named "SALES" has been defined from an Oracle database.

Returning to FIG. 3, once the data models are created (STEP 310) a set of views can be created based on these data models (STEP 320). The same graphical application depicted above with respect to FIGS. 4-13 may also be used, to assist a user in defining views from various data models.

Figure 14:
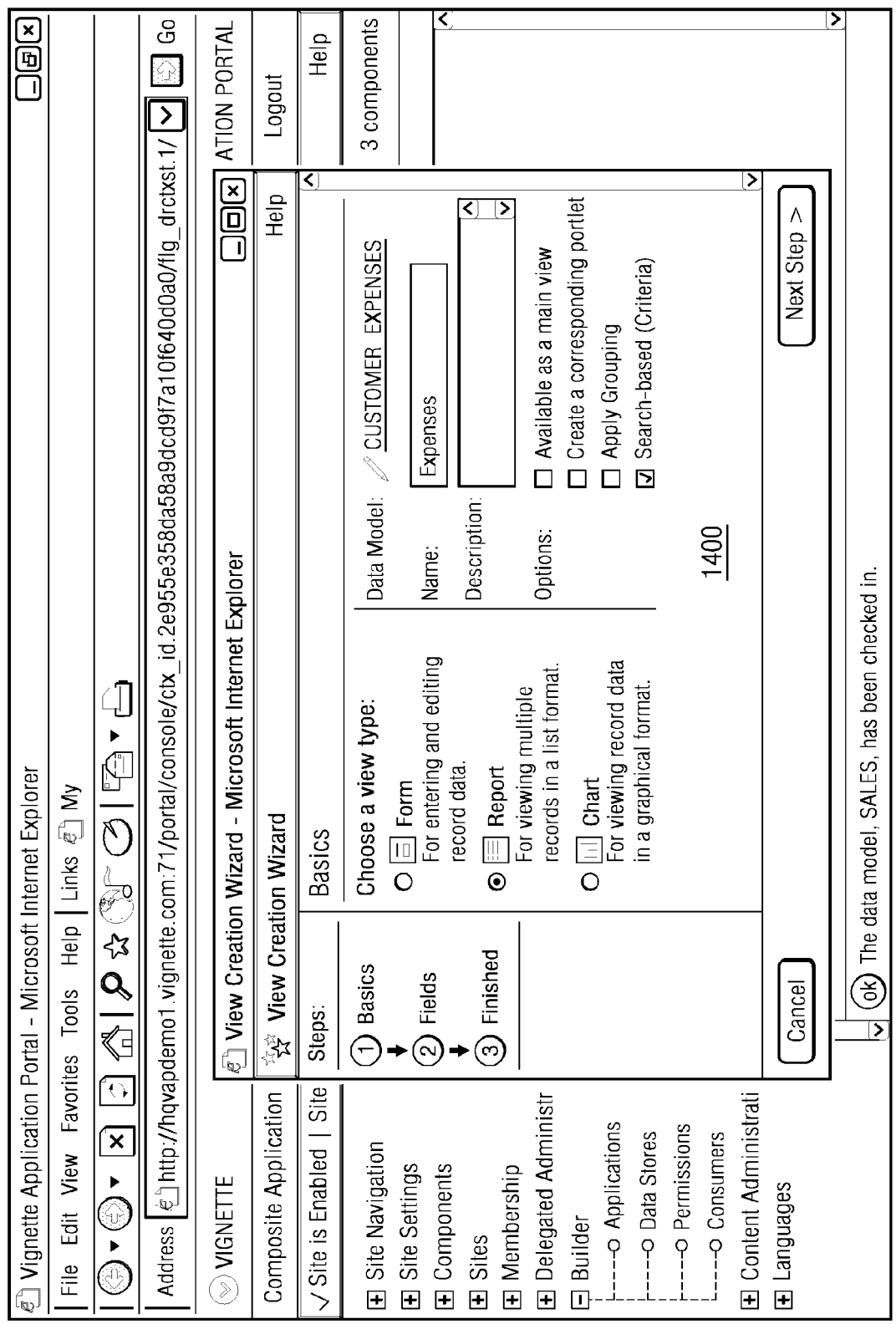

FIGS. 14-19 depict an embodiment of defining a view using a graphical application. When a user elects to create a view, a screen may be presented to the user to assist in creating a view. This screen is depicted in FIG. 14. Screen 1400 may be part of a view creation wizard intended to assist the user in creating a view. Screen 1400 allows the user to select the type of view he wishes to create. In one embodiment, these types comprise a chart, a form, or a report, as described above. The user may also use screen 1400 to designate which data model the view is to be based on, the name of the view being created and certain options available in conjunction with the view. For example, in the screen depicted in FIG. 14, the user has selected to create a view named "Expenses" of the report type, based on the data model "CUSTOMER_EXPENSES" 1310. The user has also designated that the view created may be searched according to a criteria.

Figure 15:
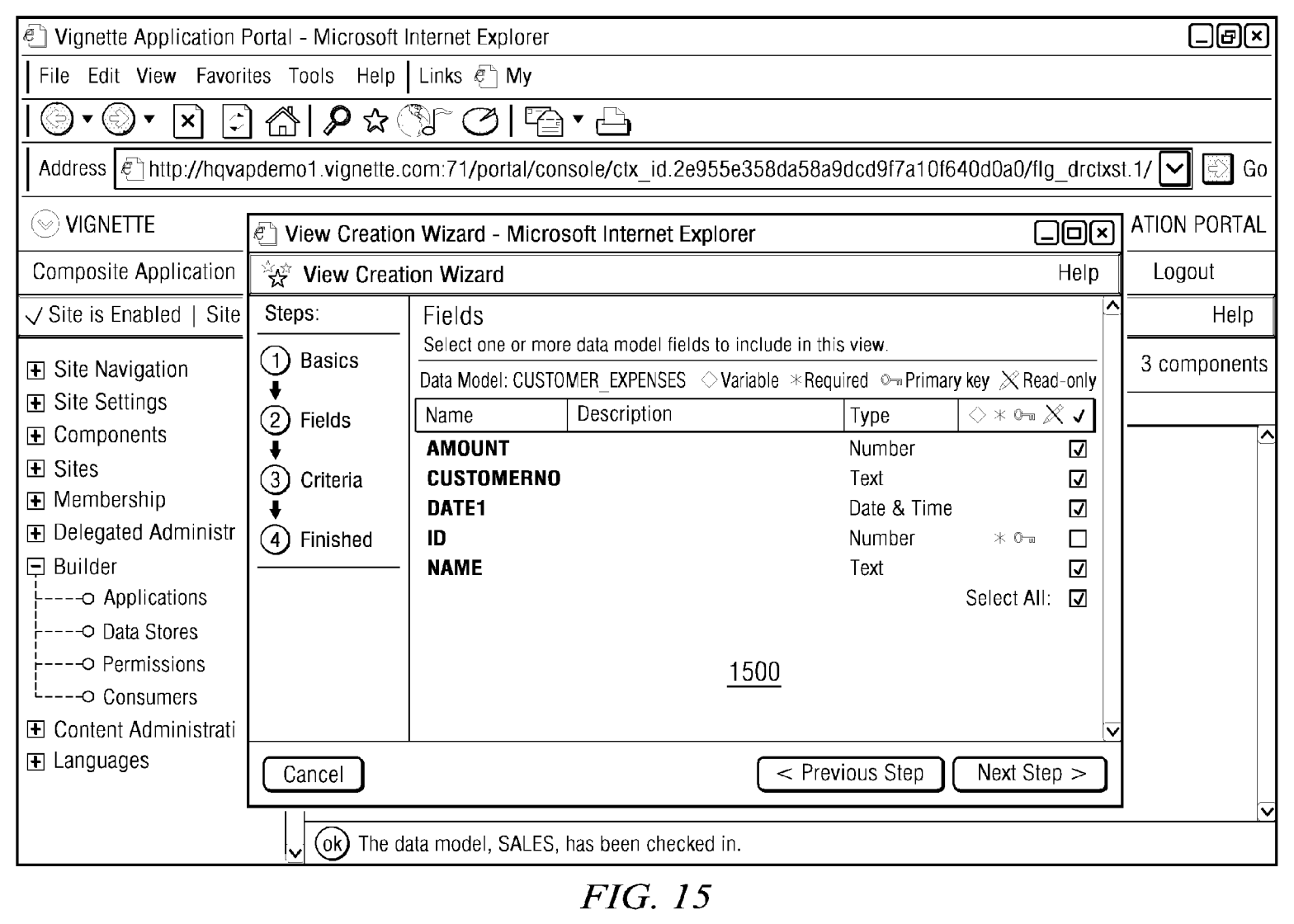

The user is then presented with a screen, such as that depicted in FIG. 15, that presents to the user the fields contained in the data model on which the view is based, and allows the user to select the fields in the data model that the user wishes to include in the view being created. As can be seen from screen 1500 the user may select these fields by placing a check in the box corresponding to the field. Note that in screen 1500, the user has selected all the fields except for the "ID" field.

Figure 16:
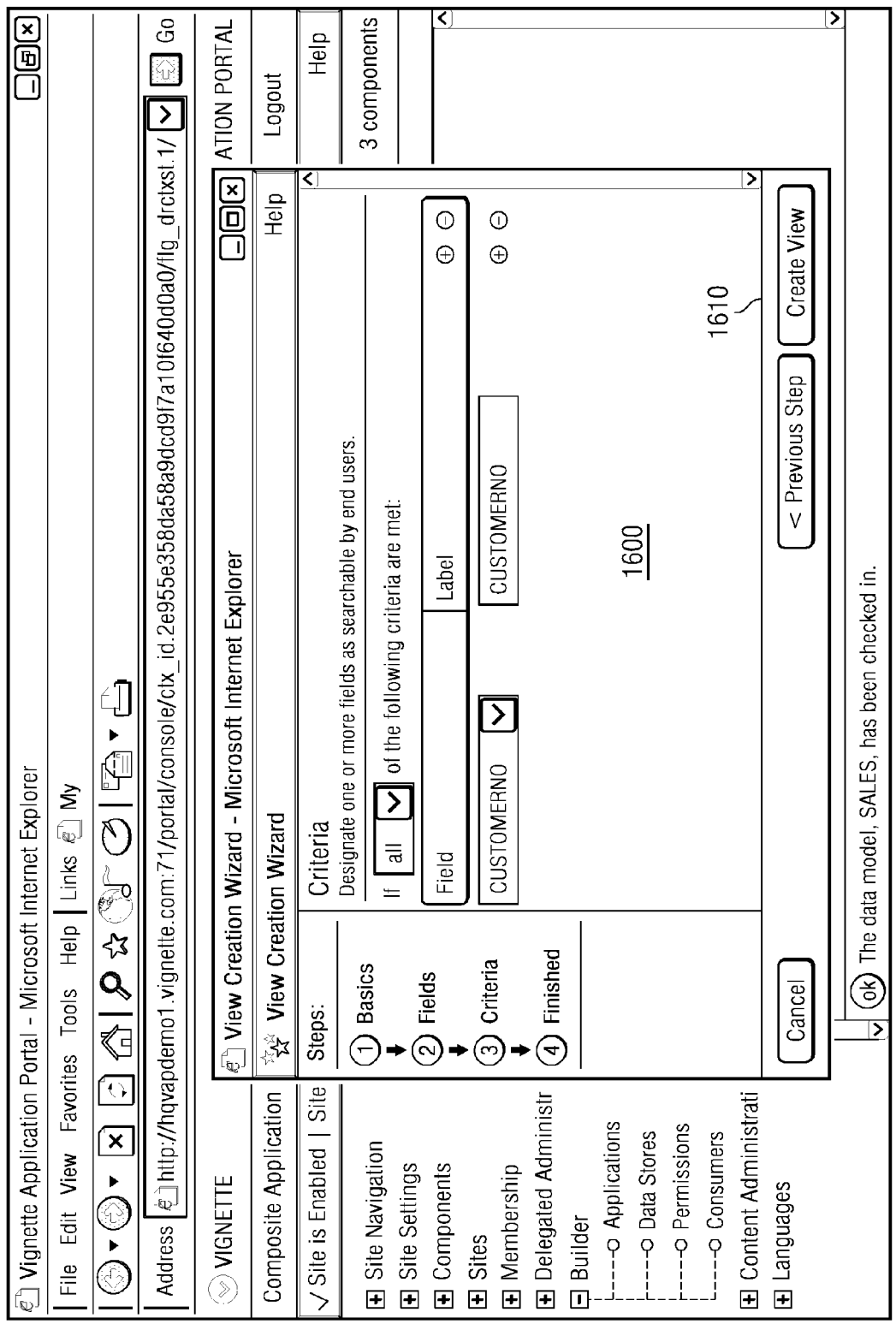

Next, if the user has designated that the view being constructed should be searchable by criteria, the user may be presented with a screen allowing the user to designate which fields in the view may be searched using a criterion. An embodiment of this screen is shown in FIG. 16. Screen 1600 allows the user to select a data field from the data model to use as a search criterion to be used with the view, and designate a label for this criterion. Thus, the data displayed by the view may be altered according to the criterion designated in screen 1600. Notice that in screen 1600 the user has designated that the view can be searched or altered based on the field "CUSTOMERNO" and has labeled this field "CUSTOMERNO" as well. The user may then create the view by clicking on the "Create View" button 1610.

Figure 17:
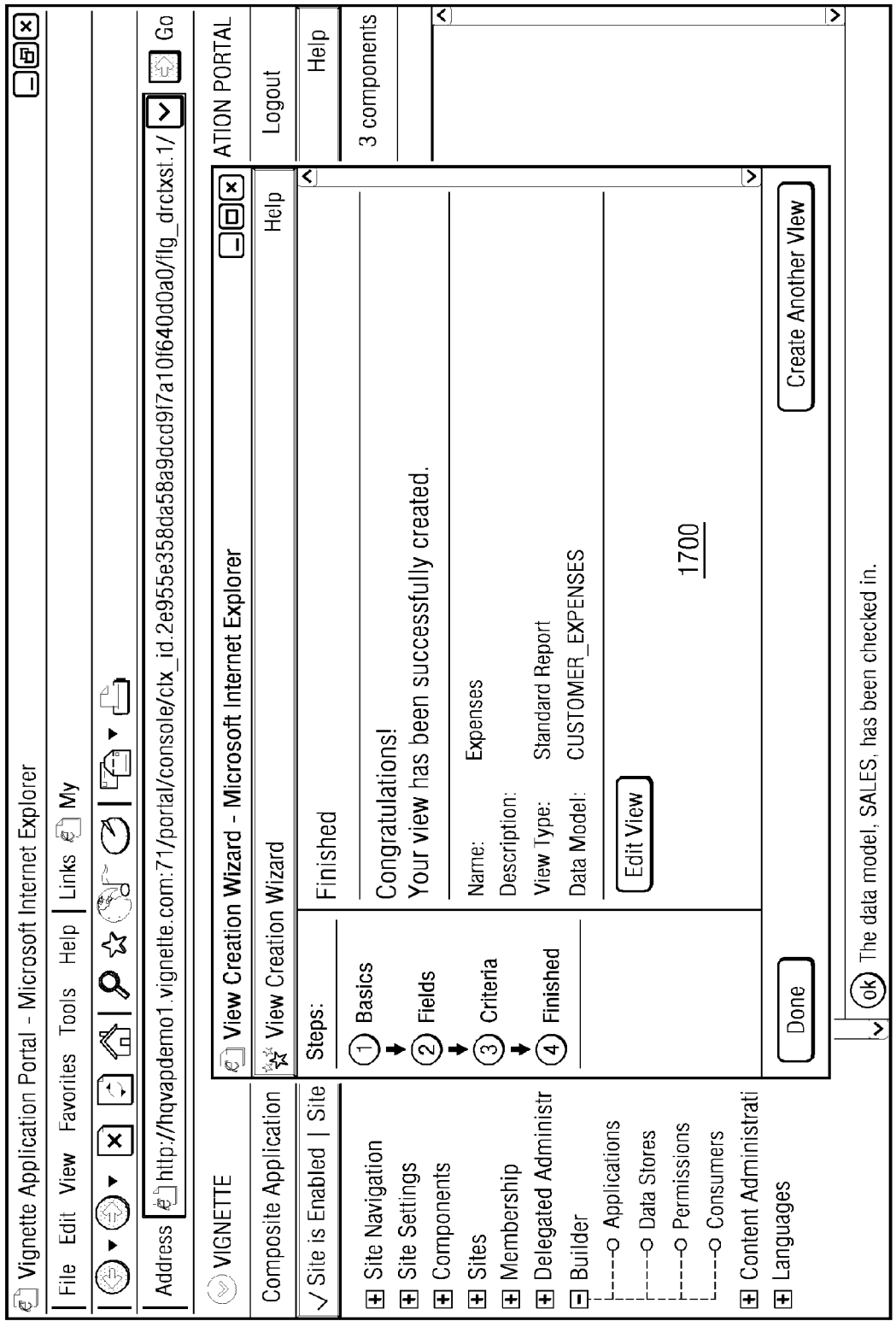

After the user hits "Create View" button 1610, a screen may be displayed confirming to the user that the view has been created, as depicted in FIG. 17. Screen 1700 indicates that the view "Expenses" which is a report type view based on the data model "CUSTOMER_EXPENSES" has been created.

Figure 18:
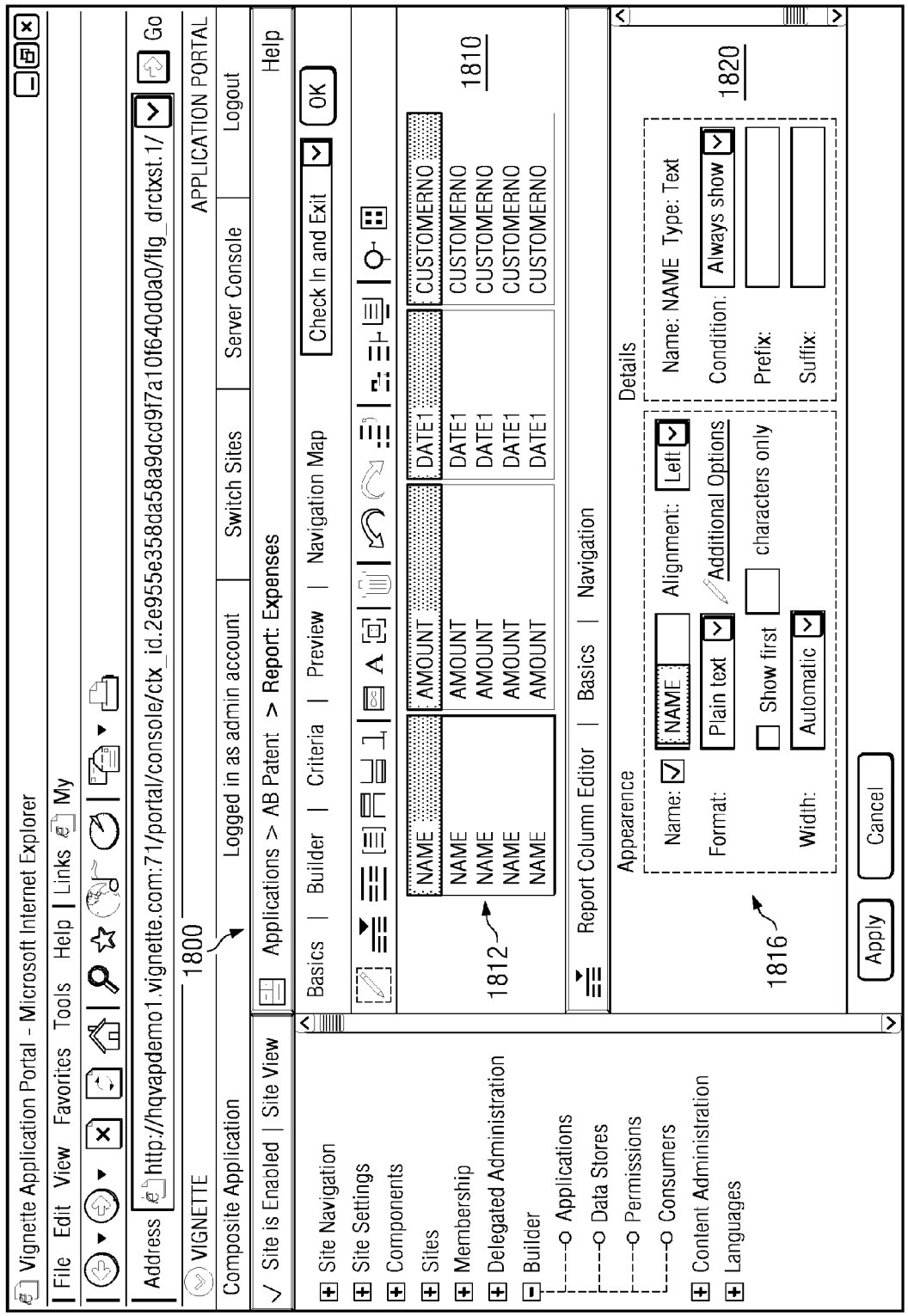
Figure 19:
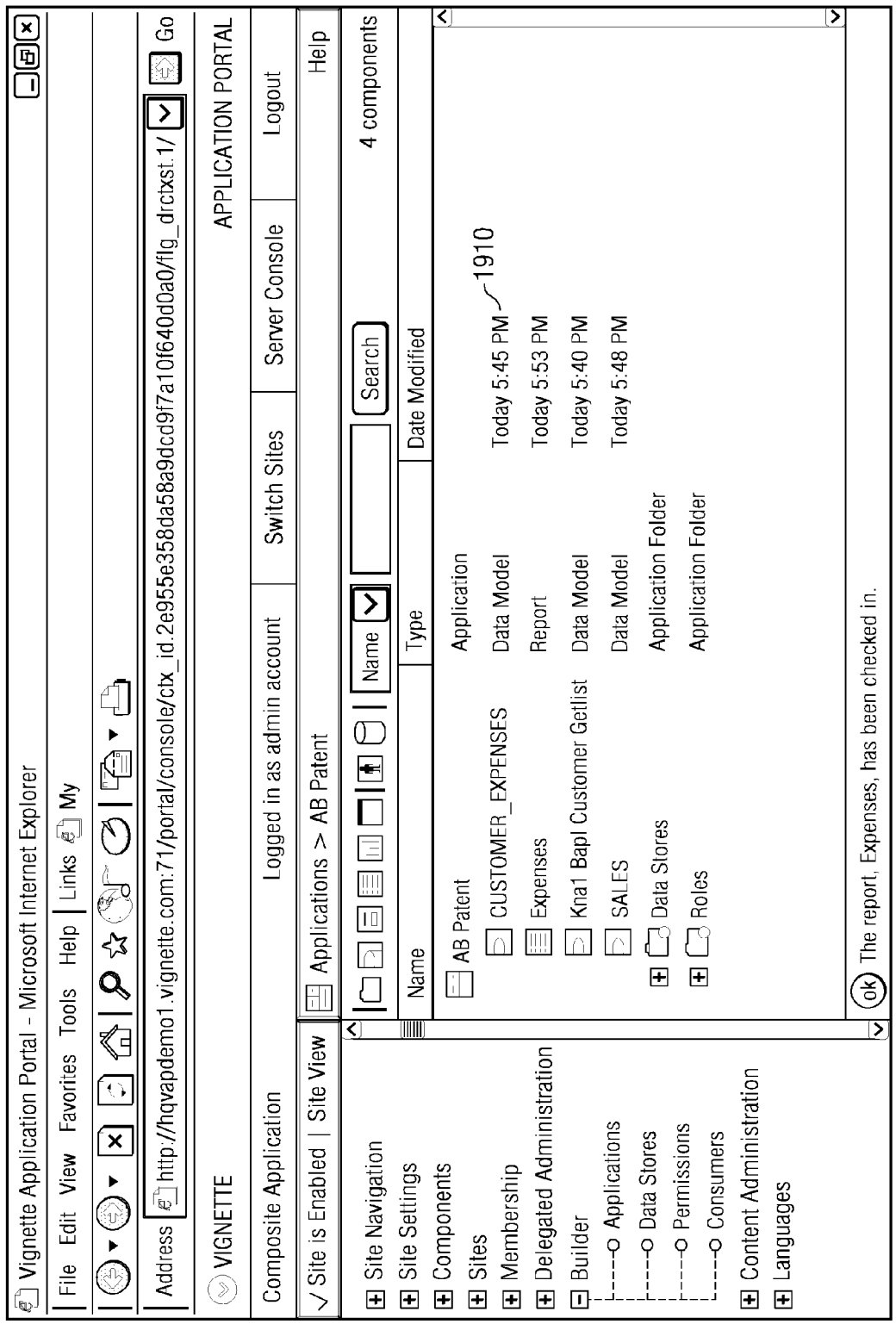

The user may then be presented with a preview of the created view along with an editor to allow further definition of the presentation of the view. One embodiment of a screen for presenting the user with a preview of the view, and an editor is depicted in FIG. 18. Screen 1800 contains frame 1810 which presents format 1812 of how the created view will appear. This format 1812 may be altered using editor 1816 presented to the user in frame 1820. More specifically, the user may highlight a portion of format 1812 and the parameters of the highlighted portion appear automatically in editor 1816. The user may then alter the parameters in editor 1816 to alter format 1812 of the created view. In screen 1800, the user is in the midst of editing the "name" portion of format 1812. FIG. 19 depicts how a created view is displayed in the applications list of components. Screen 1900 depicts "Expenses" view 1910 of type report.

Figure 20:
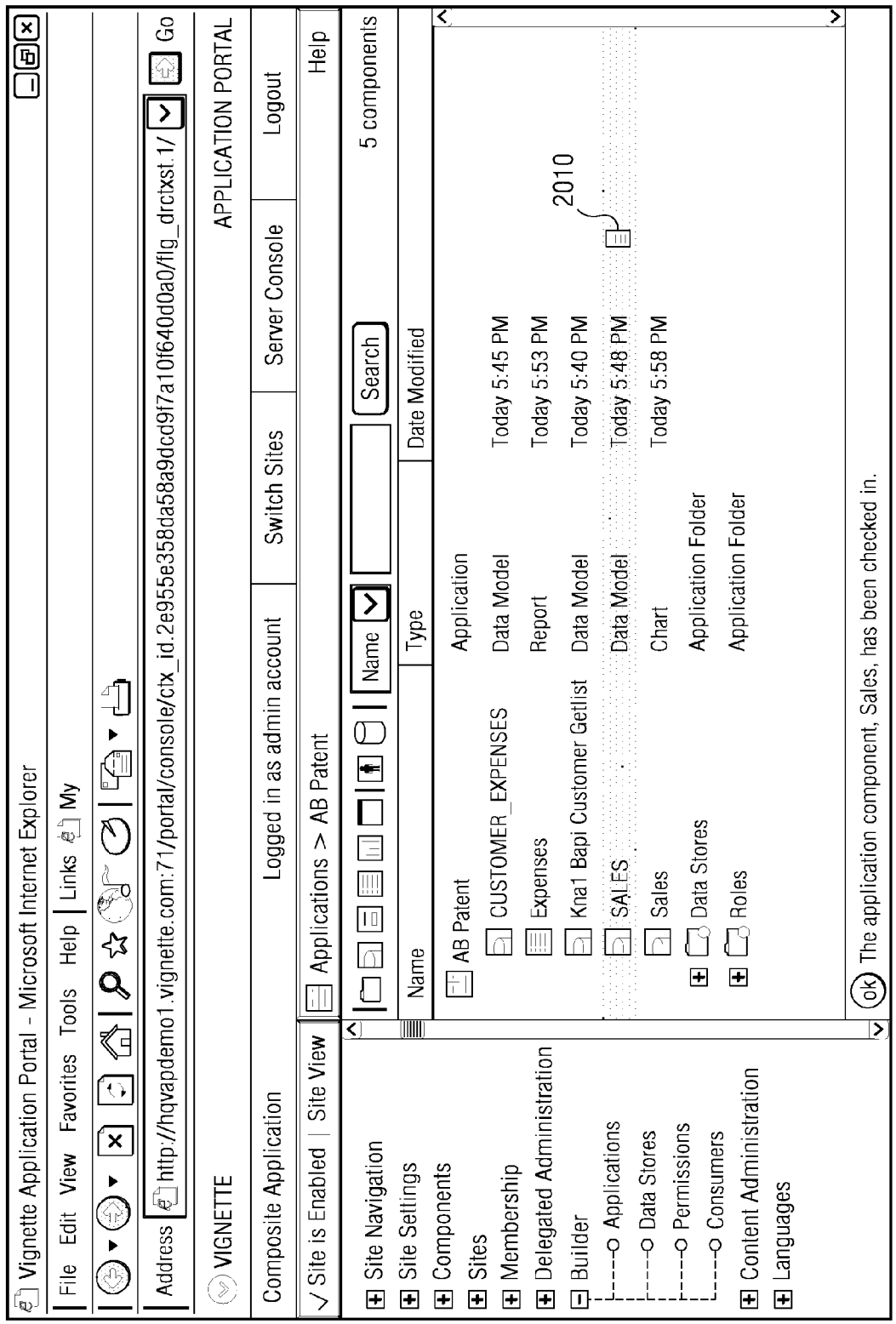
FIG. 20 includes a representation of one embodiment of an interface for displaying defined components.

It will be apparent to those of skill in the art that many views may be created based on a variety of data models, including charts, forms and reports. It will also be apparent that more than one view may be based on the same data model, for example one view may present data in a data model as a chart while another view may present the same data as a report. Additionally, screens tailored to each type of view may be presented to a user to aid in the creation of a view from a data model. FIG. 20 depicts the appearance of the defined list of components after another view 2010 has been added. View 2010 is named "Sales" and is a view of type chart.

During definition of a view, subviews may also be defined for the view. By defining subviews for a view, whenever a view is displayed subviews of the view may also be formed and displayed. The same graphical application depicted above with respect to FIGS. 4-20 may also be used to assist a user in defining views from various data models.

Figure 21:
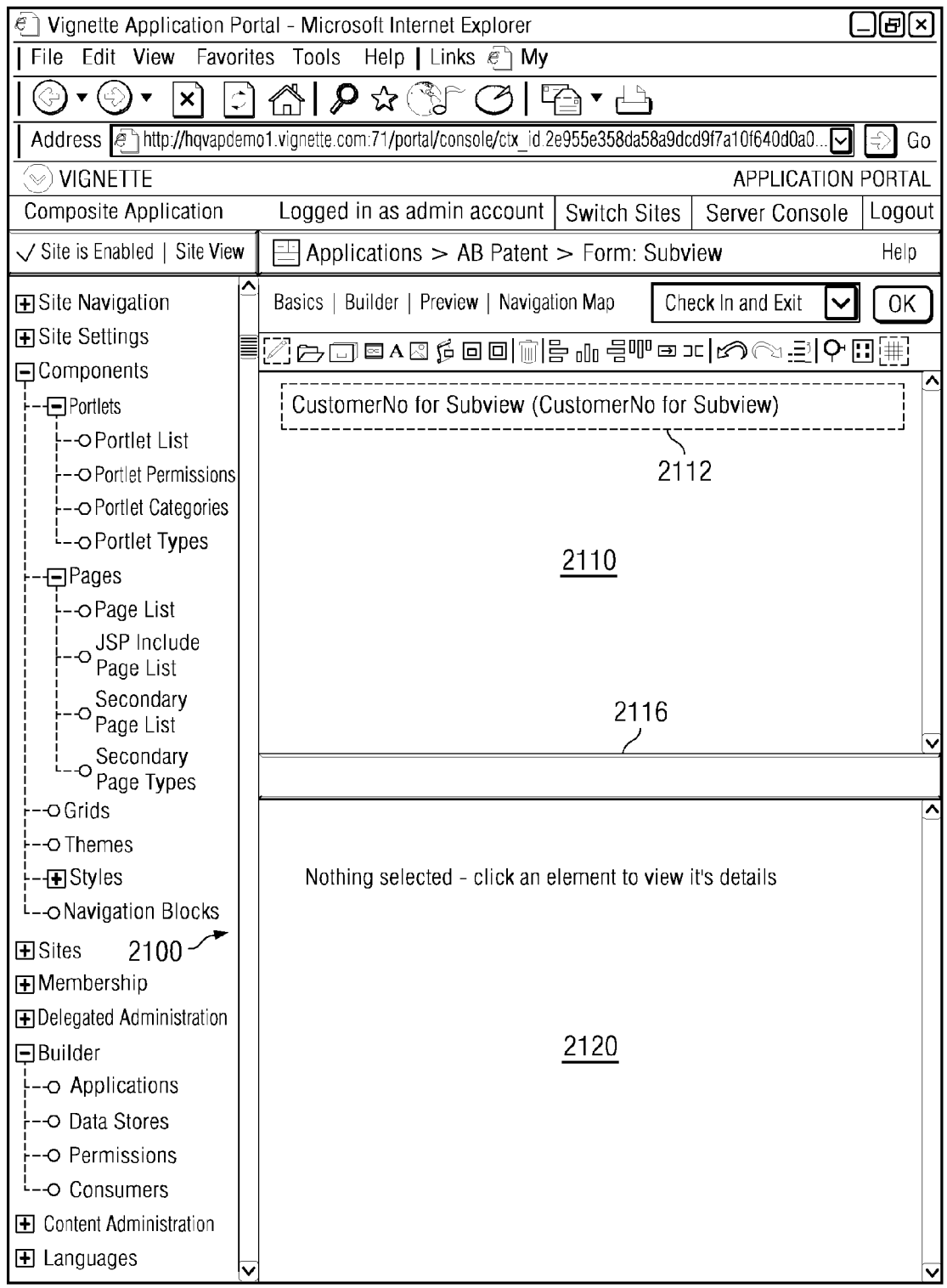

FIGS. 21-27 depict the process for defining subviews of a view in more detail. Suppose a subview named "Subview" of type form has been defined. FIG. 21 depicts a screen presenting a preview of the created view along with an editor to allow further definition of the presentation of the view similar to that depicted in FIG. 18. Screen 2100 contains frame 2110 which presents format 2112 of how the created view "Subview" will appear. This format 2112 may be altered using editor 2116 presented to the user in frame 2120. More specifically, a user may choose to define two subviews for the view "Subview".

Figure 22:
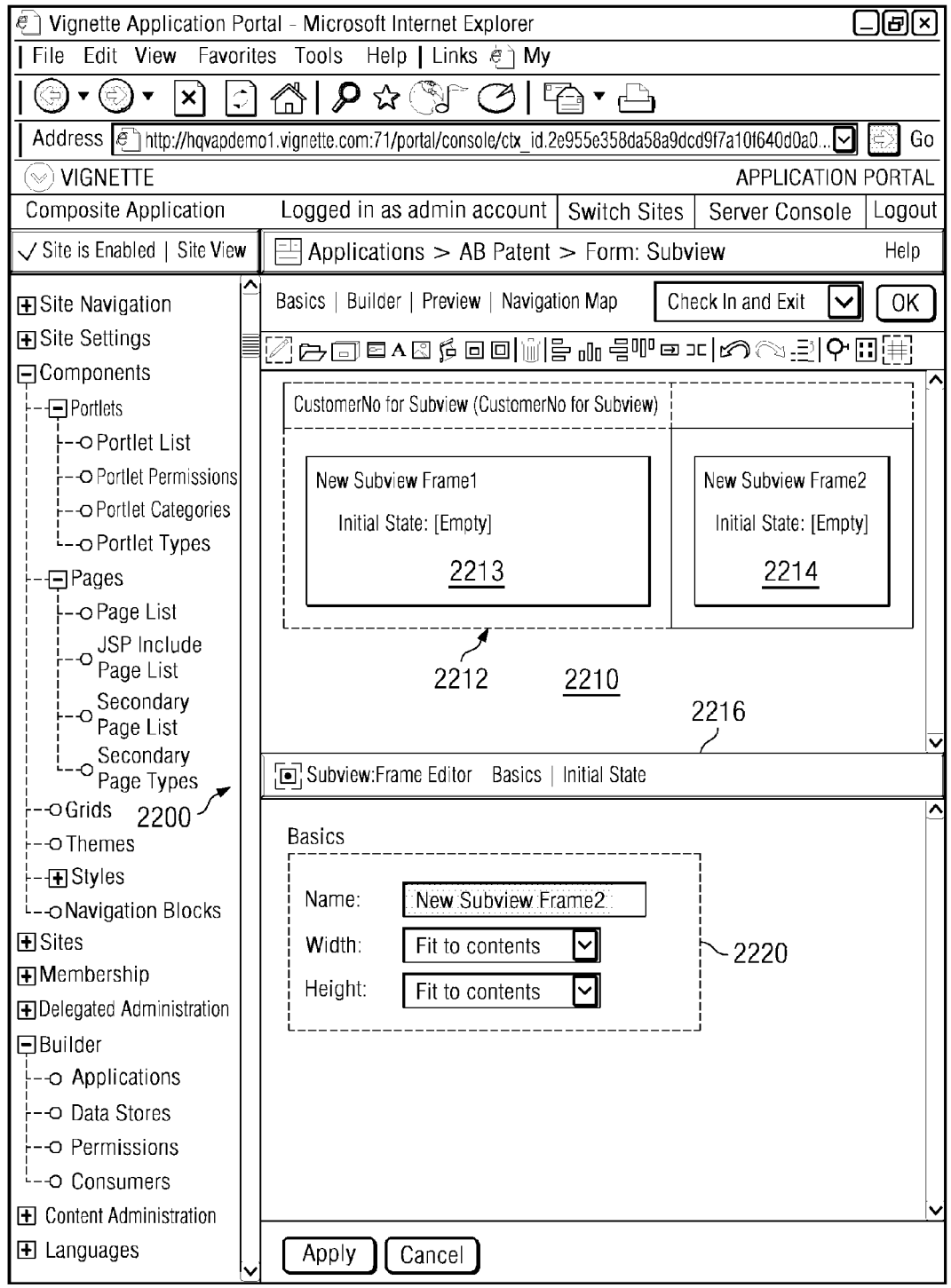

FIG. 22 depicts the format 2212 of the view "Subview", including two subview frames 2213 and 2214 indicating where the two added subviews are to be displayed. By clicking on one of the subview frames 2213, 2214 a user may edit the appearance of the subview frame, and assign a view to be displayed in that subview frame. Notice in screen 2200, the user has clicked on subview frame 2214 "New Subview Frame 2" and the parameters for "New Subview Frame 2" appear in editor frame 2220. These parameters can then be altered to refine the appearance of the view which will appear in subview frame 2214.

Figure 23:
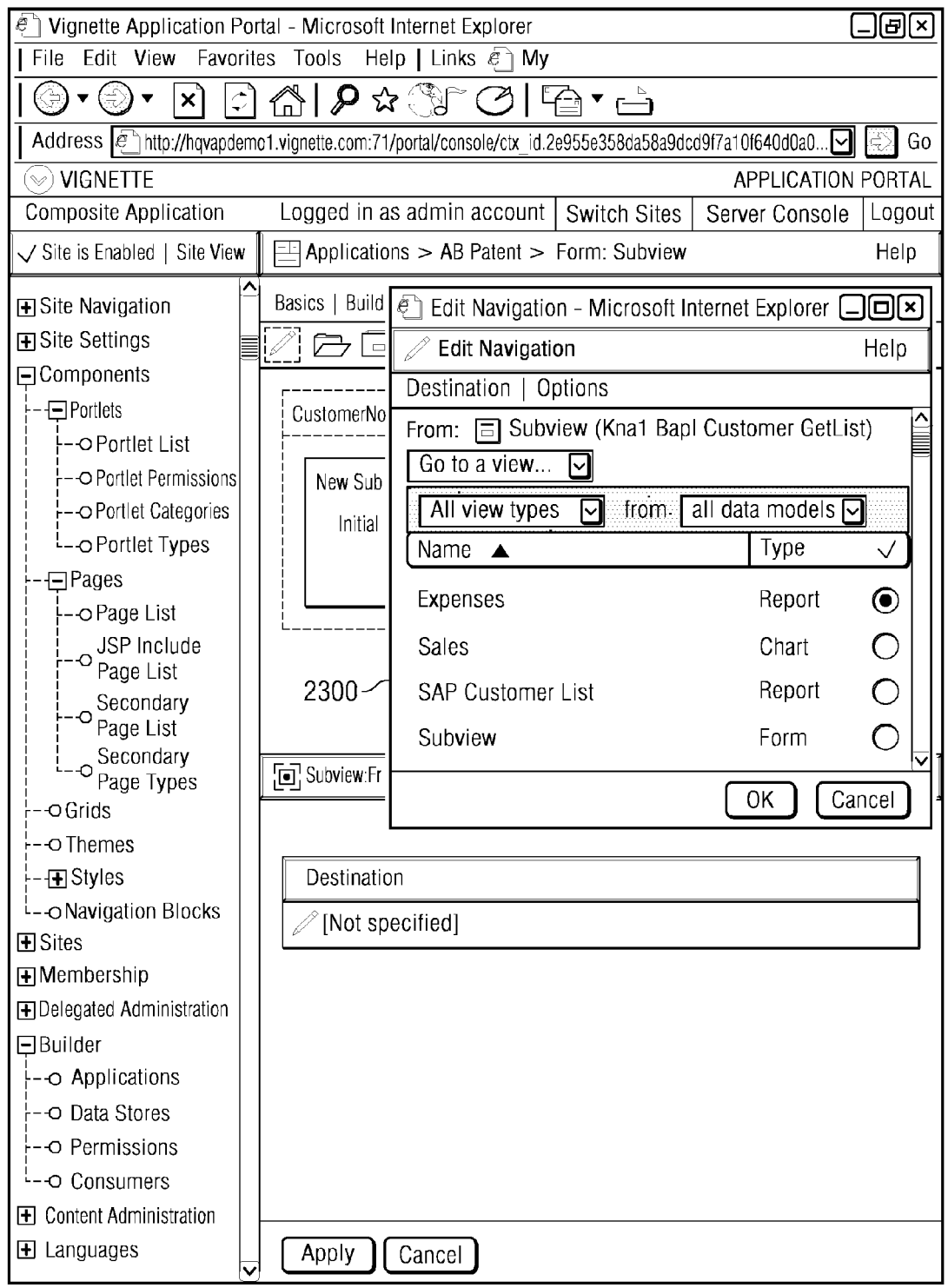

Views can then be associated with each of subview frames 2213, 2214. By clicking on subview frame 2213 a screen may be presented to the user to allow a user to select a view to be presented in subview frame 2213. FIG. 23 depicts one embodiment for such a screen. Screen 2300 presents a list of the available views from which the user can select. A user can then select one of these views screen for display in the subframe. Notice in screen 2300 the user has selected the view "Expenses" for display in subframe 2213.

Figure 24:
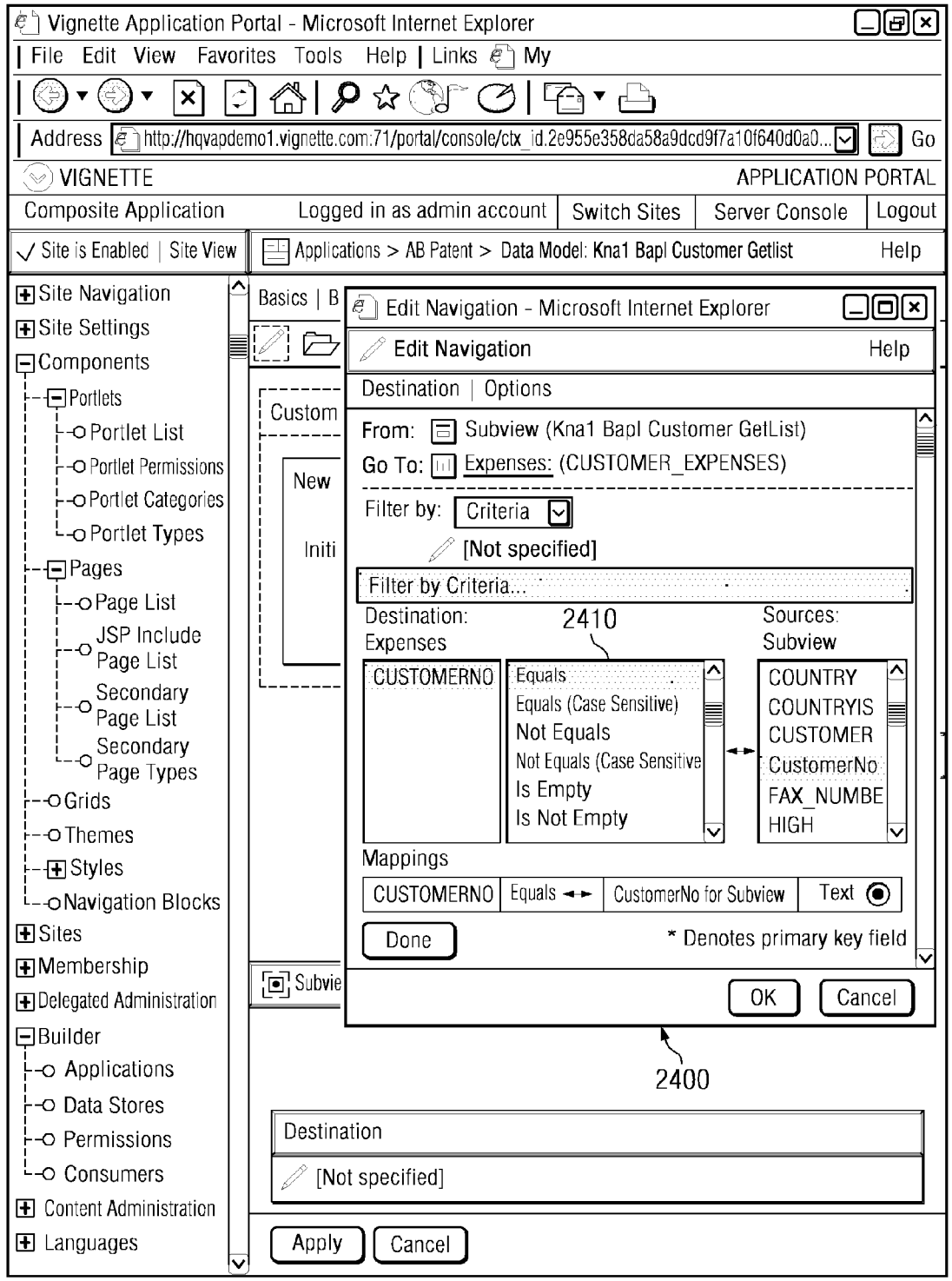
Figure 25:
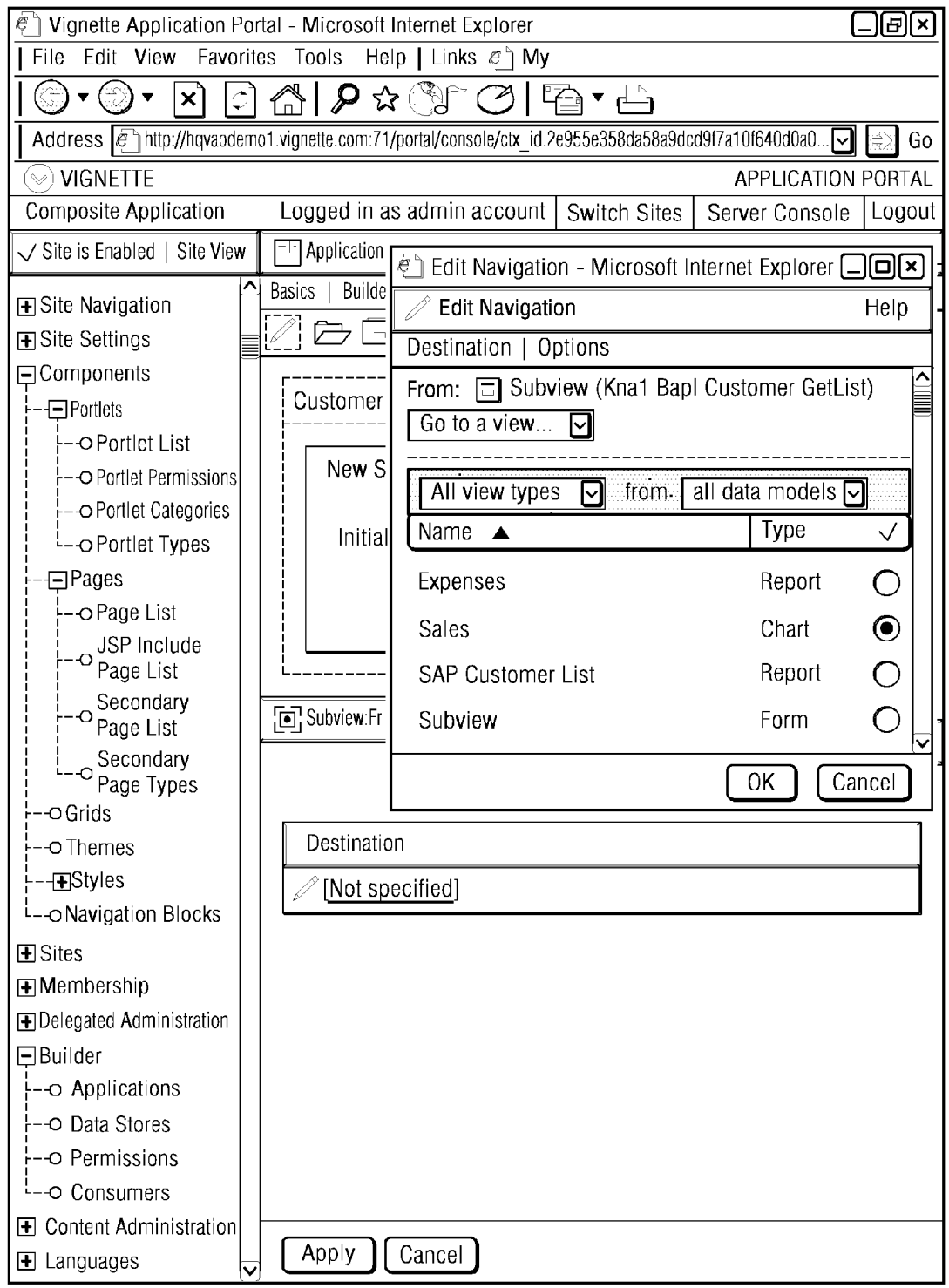
Figure 26:
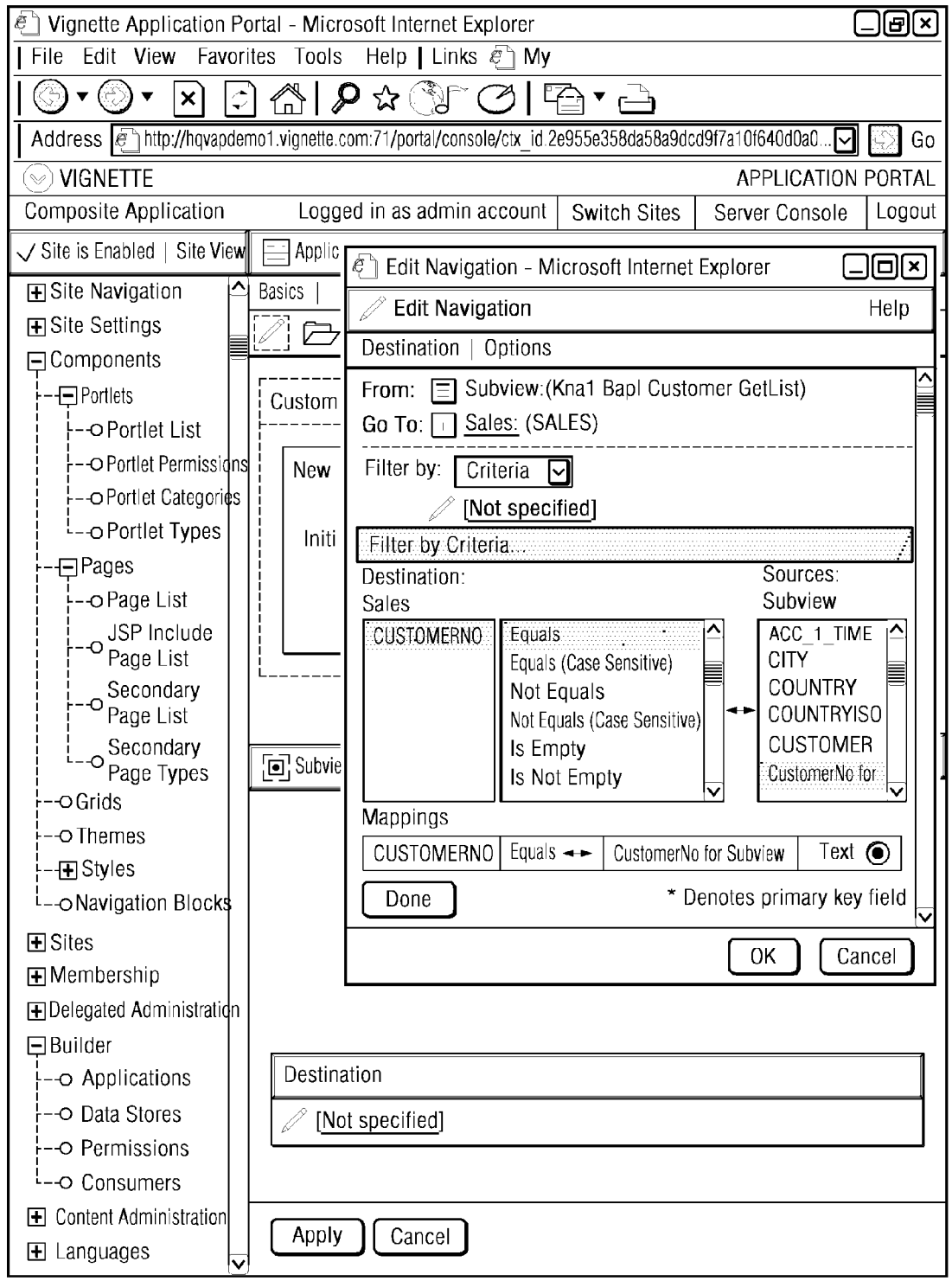
Figure 27:
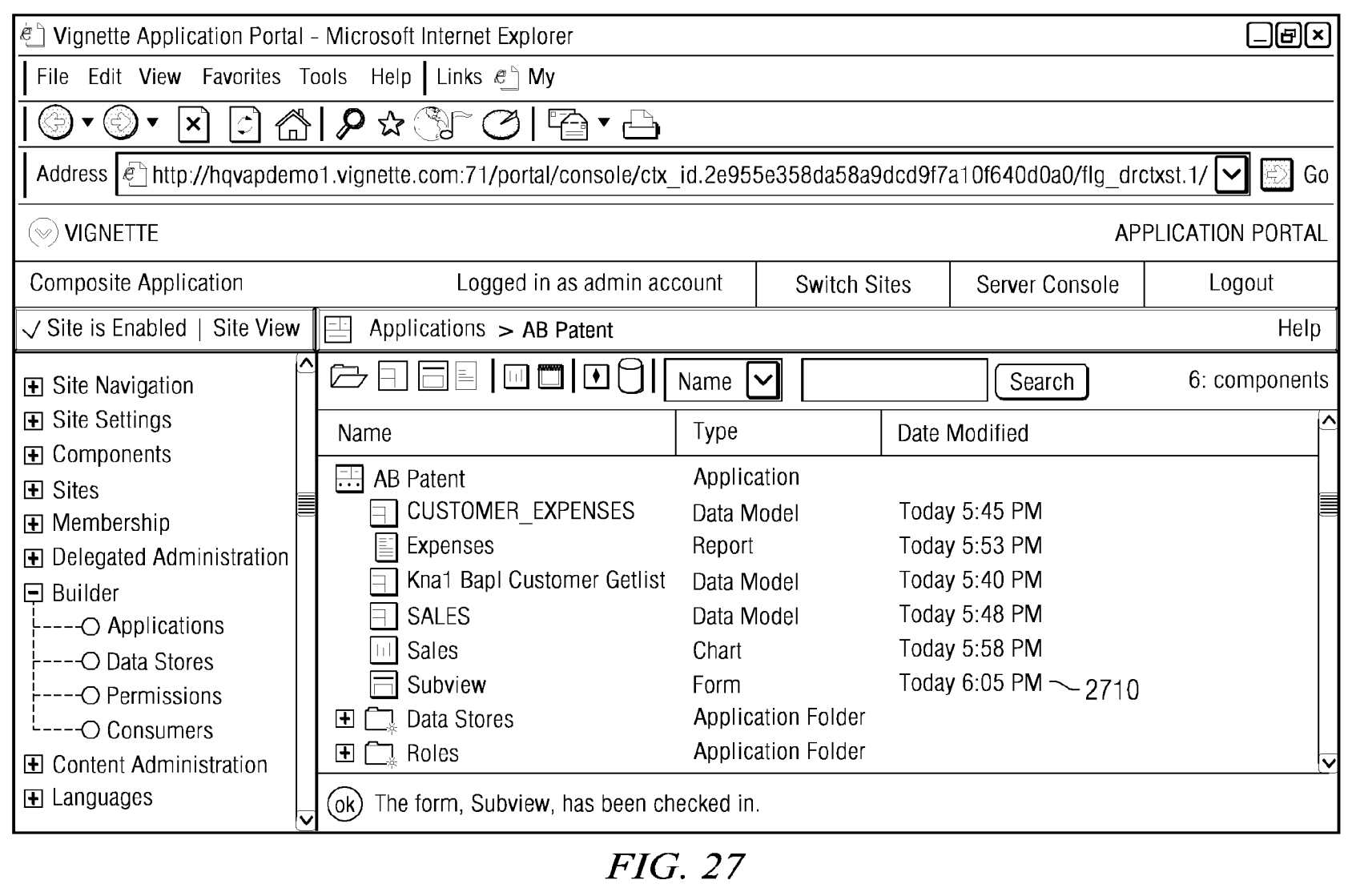

If the subview selected is searchable by a criterion, the user may then be presented with a screen allowing the user to map the field to be searched for the criterion in the subview to a field in the parent view. Thus, the subview may display data associated with a criterion mapped from the parent view. One embodiment for a screen of this type is depicted in FIG. 24. As can be seen from screen 2400 operators 2410 may also be used to further clarify the mapping between fields for a subview and a parent view. Similarly, FIGS. 25 and 26 depict the subview selection and field mapping process for subview frame 2214. FIG. 27 depicts a screen displaying the defined components after the view "Subview" 2710 has been created.

Turning back to FIG. 3, once a set of views is created (STEP 320) one of these views may be utilized as the master view for the composite view (STEP 330). This view may be selected from among the already created views (STEP 330) or another view may be created-in the set (STEP 320) and utilized as the master view (STEP 330). FIGS. 28-34 depict the creation of a new view (STEP 320) and utilizing the newly created view as the master view (STEP 330).

Figure 28:
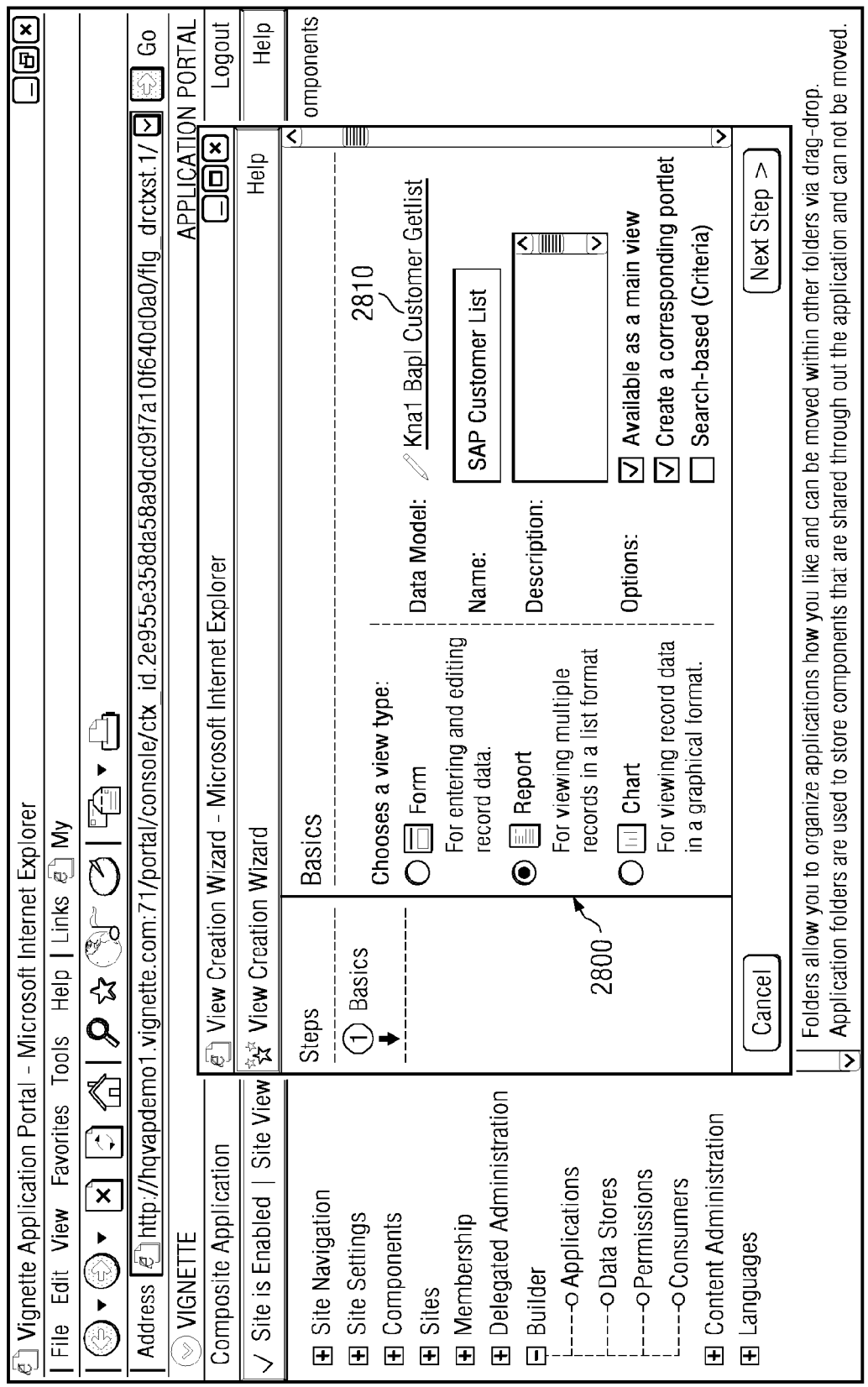
FIGS. 28-34 include a representation of one embodiment of an interface for defining and editing a view to be used as a master view, including defining subviews.

As noted above, a screen may be presented to the user to assist in creating a view. This screen is depicted in FIG. 28. Screen 2800 may be part of a view creation wizard intended to assist the user in creating a view. Screen 2800 allows the user to select the type of view he wishes to create. For example, in the screen depicted in FIG. 28, the user has selected to create a view named "SAP Customer List" of the report type, based on the data model "Kna1 Bapi Customer Getlist" 2810. The user has also designated that the view created may be available as a main (or composite) view.

Figure 29:
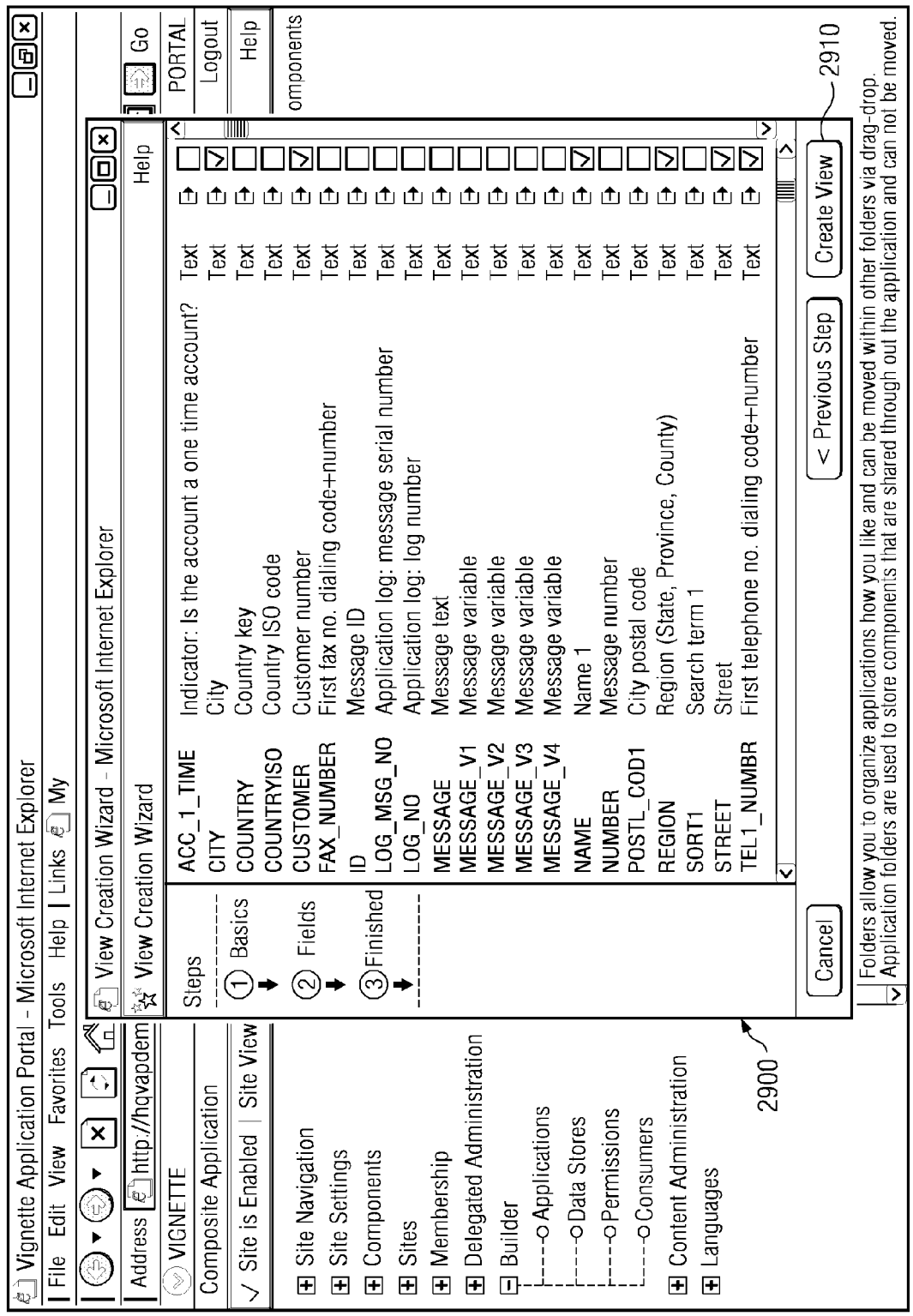

The user is then presented with the screen, such as that depicted in FIG. 29, that presents to the user the fields contained in the data model on which the view is based (note that not all fields appear on screen 2900), and allows the user to select the fields in the data model that the user wishes to include in the view being created. As can be seen from screen 2900 the user has selected certain fields by placing a check in the box corresponding to the field. Note that in screen 2900, the user has selected the fields "CITY", "CUSTOMER", "NAME", "REGION" "STREET" and TEL1_NUMBER".

Figure 30:
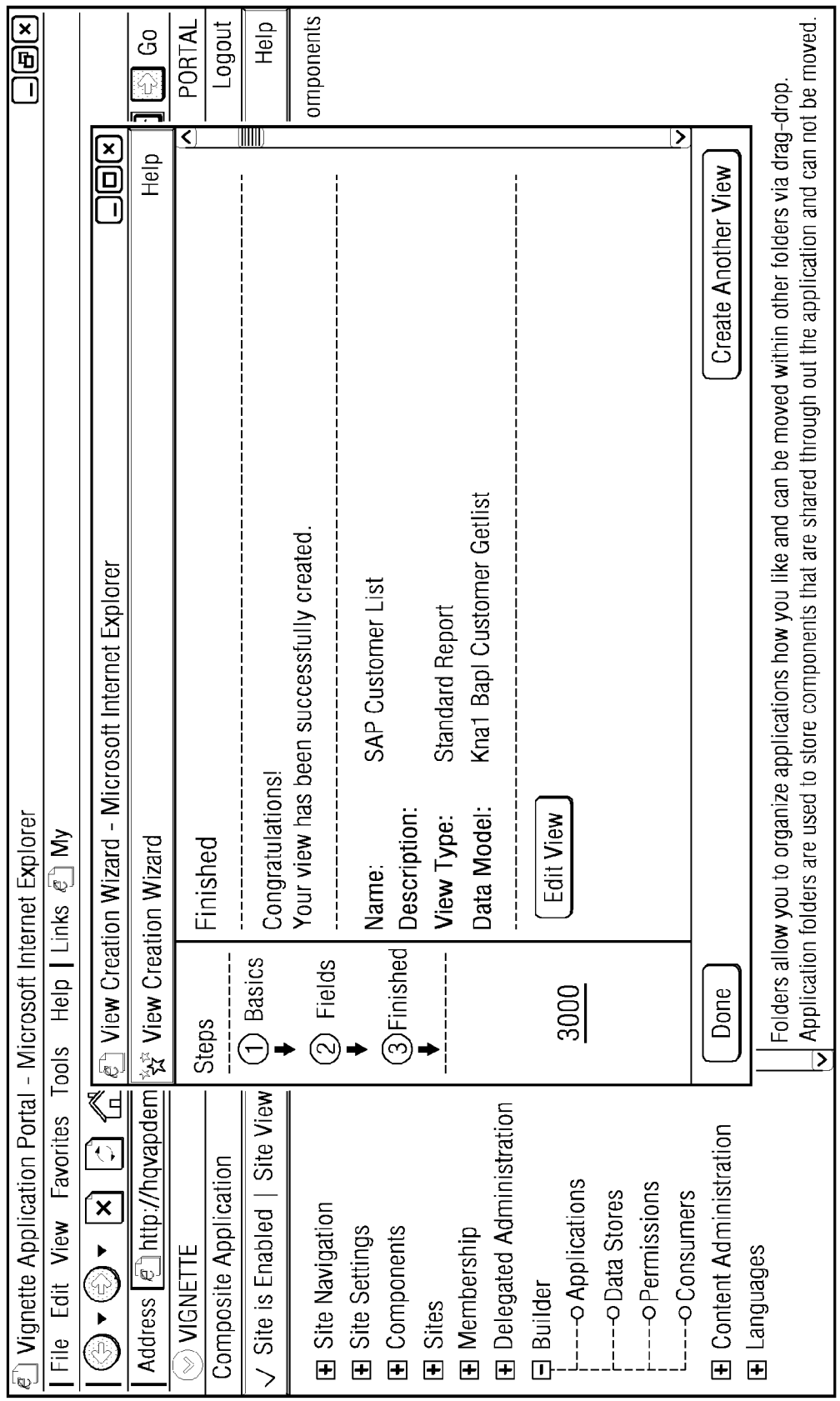

After the user hits "Create View" button 2910, a screen may be displayed confirming to the user that the view has been created, as depicted in FIG. 30. Screen 3000 indicates that the view "SAP Customer List" which is a report type view based on the data model "Kna1 Bapi Customer Getlist" has been created.

Figure 31:
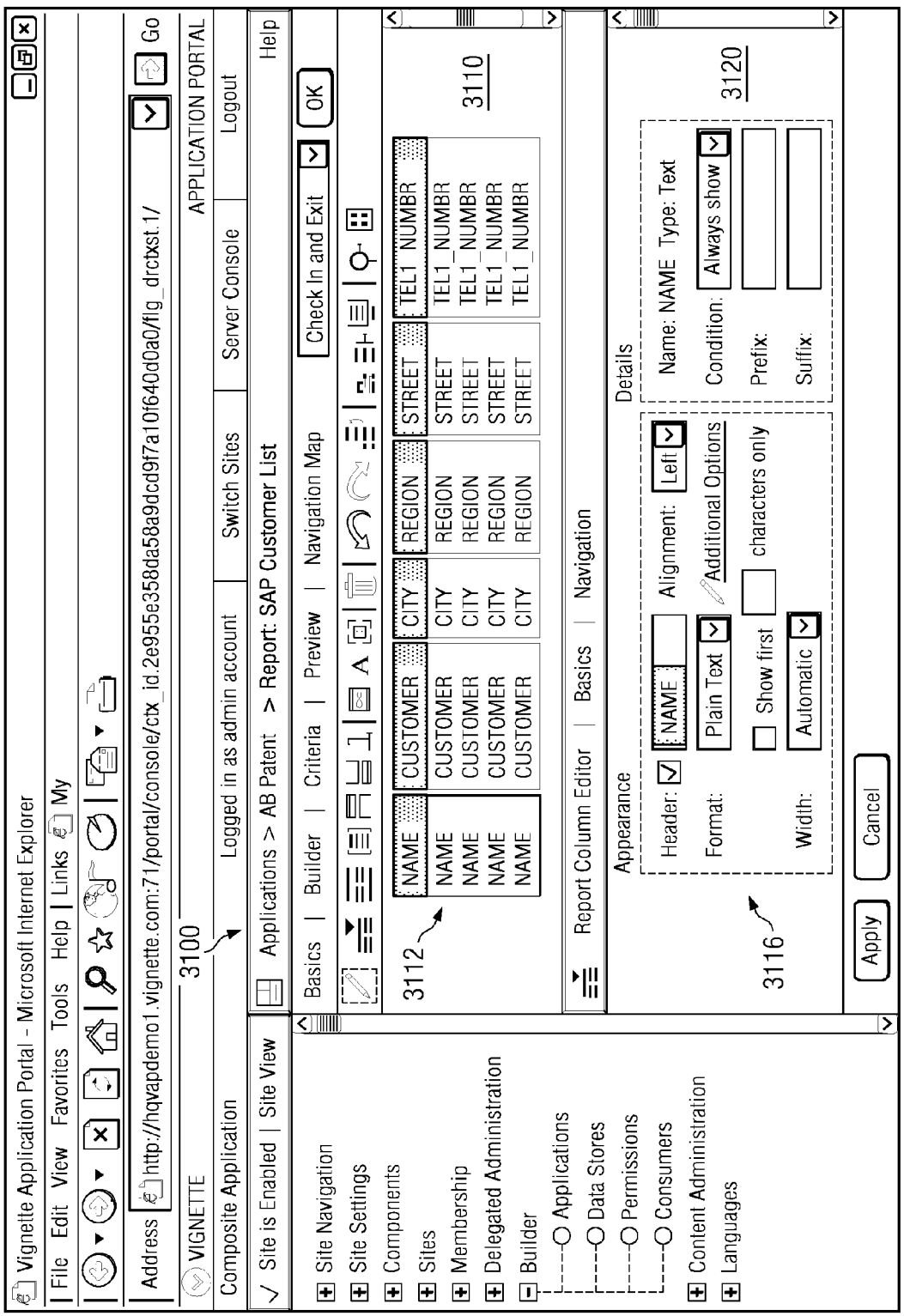
Figure 33:
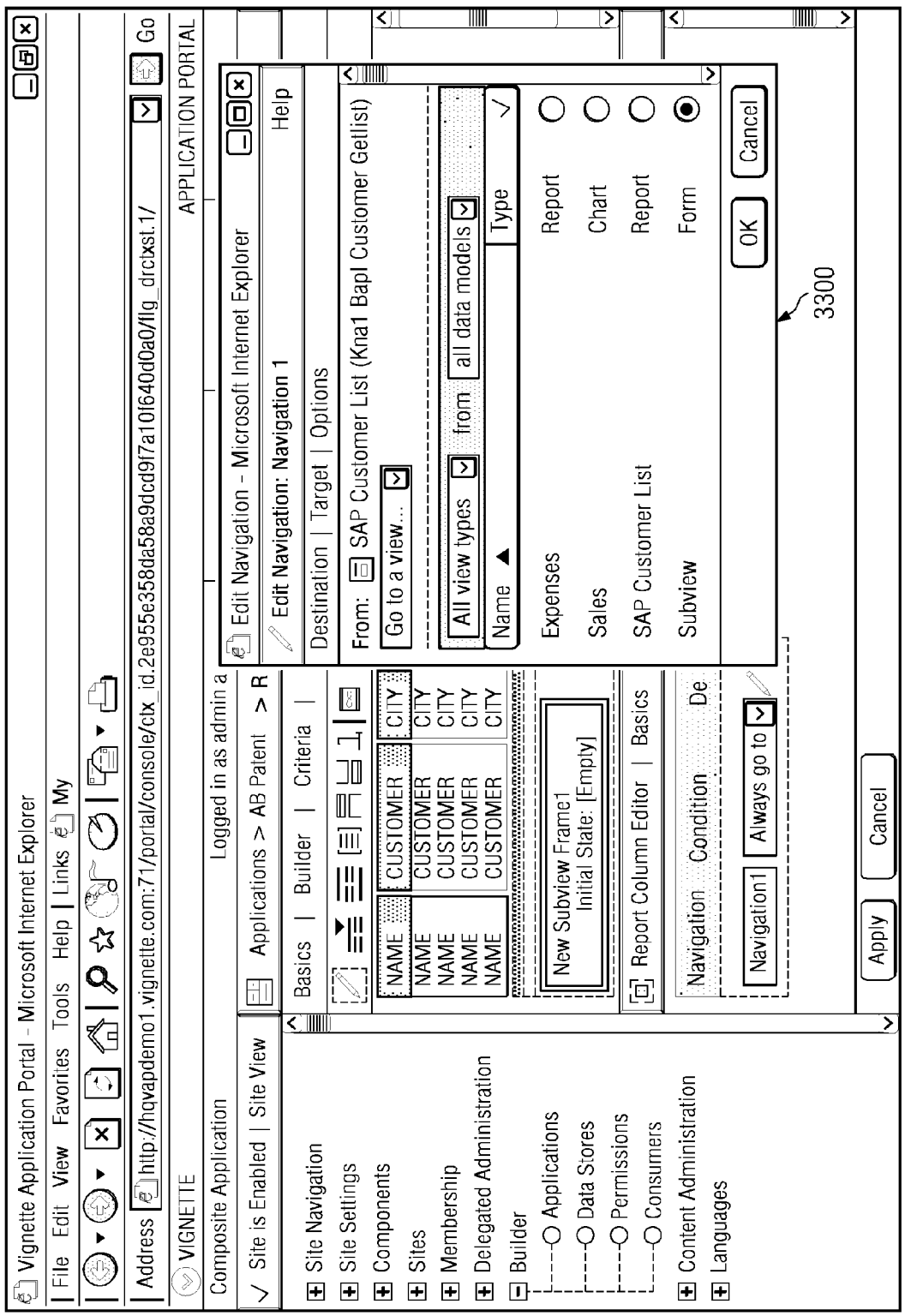
Figure 34:
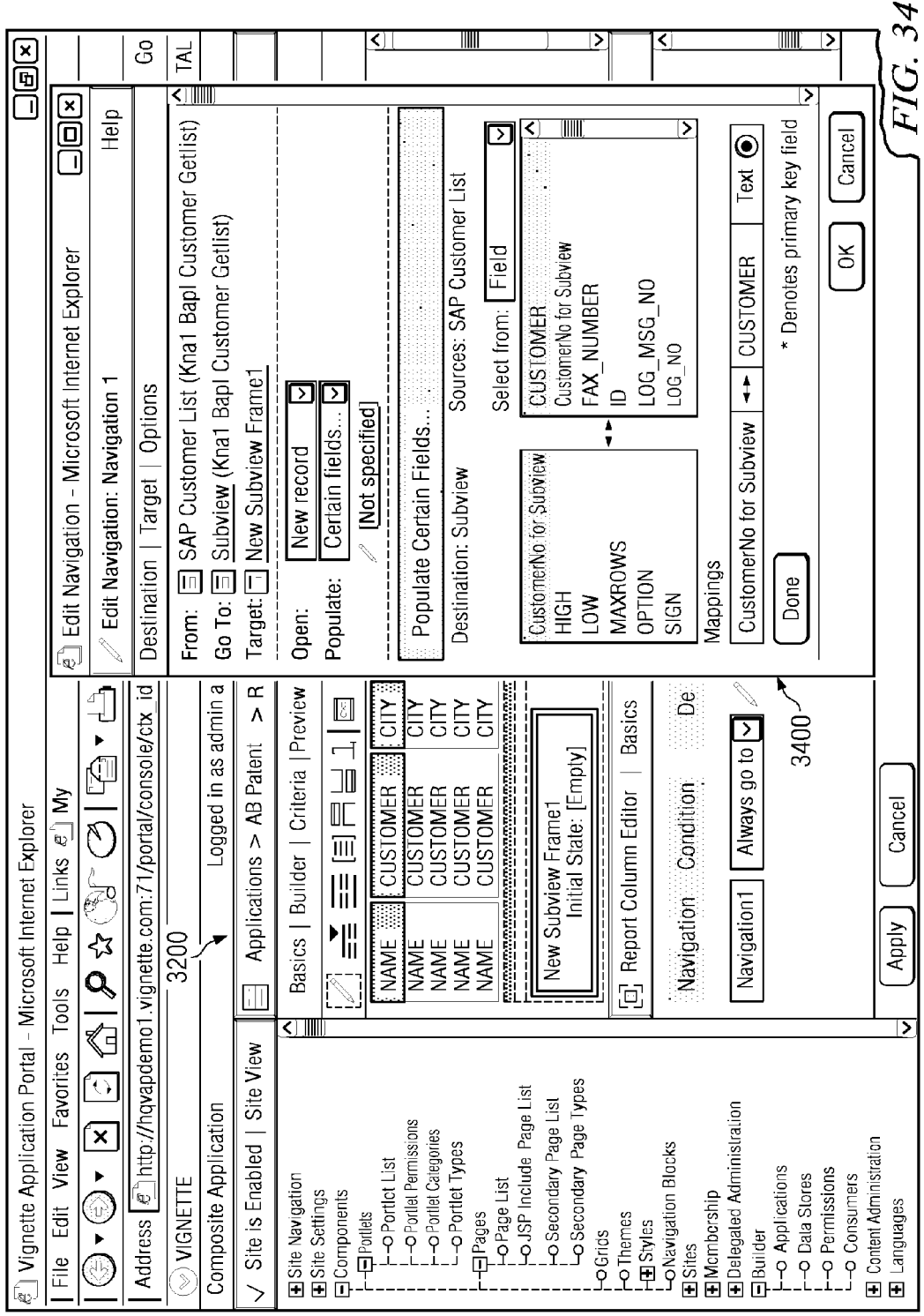

The user may then be presented with a preview of the created view along with an editor to allow further definition of the presentation of the view. One embodiment of a screen for presenting the user with a preview of the view, and an editor is depicted in FIG. 31. Screen 3100 contains frame 3110 which presents format 3112 of how the created view will appear. This format 3112 may be altered using the editor 3116 presented to the user in frame 3120. More specifically, the user may highlight a portion of format 3112 and the parameters of the highlighted portion appear automatically in editor 3116. The user may then alter the parameters in editor 3116 to alter format 3112 of the created view. In screen 3100, the user is in the midst of editing the "name" portion of format 3112. Screen 3100 can also be used to associate subviews with the master view (STEP 340), as depicted in FIGS. 32-34.

Figure 32:
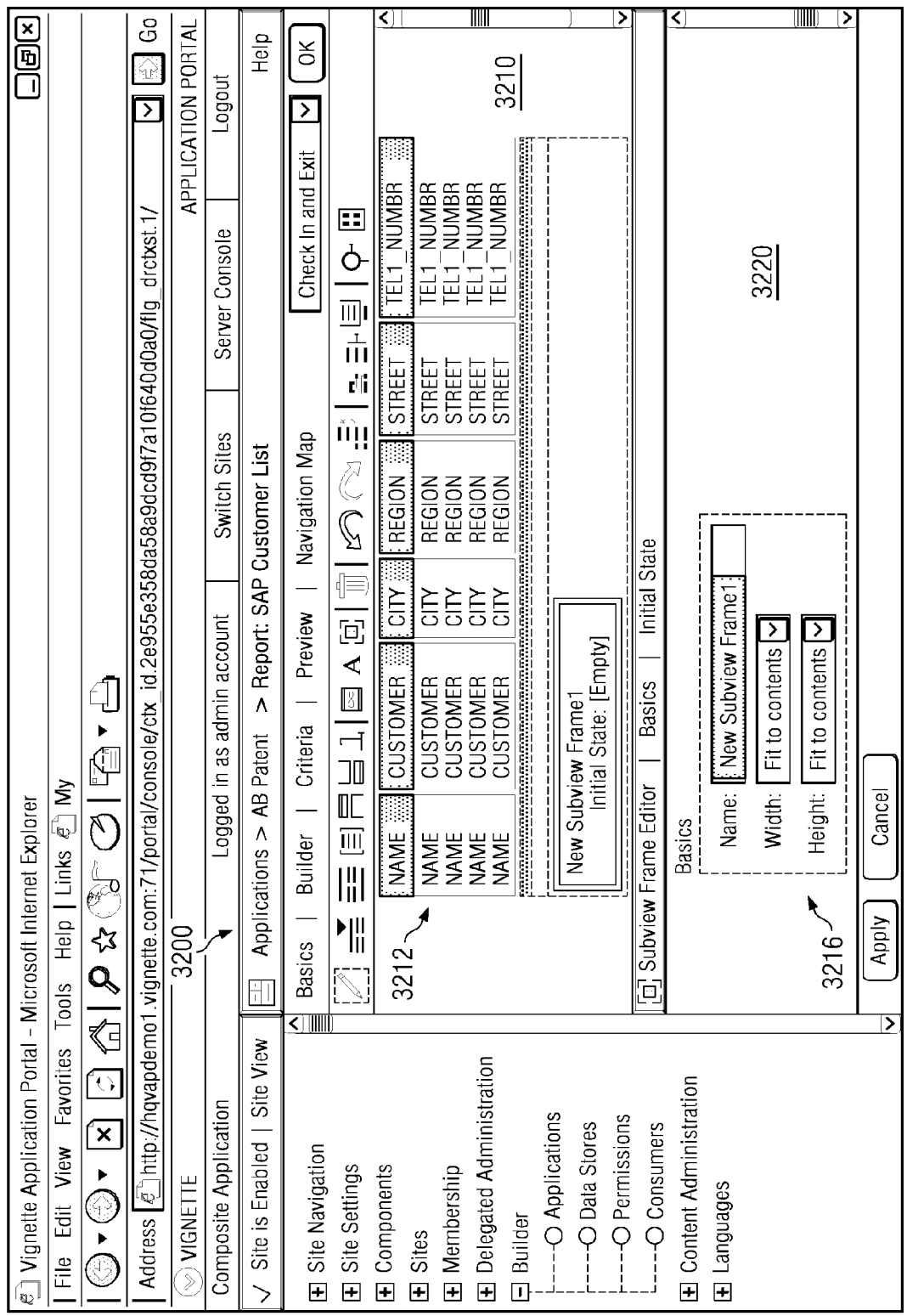

FIG. 32 depicts the format 3212 of the view "SAP Customer List" defined including subview frame 3214 indicating where a subview is to be displayed. By clicking on the subview frame 3214 a user may edit the appearance of a view appearing in subview frame 3214, and assign a view to be displayed in the subview frame 3214. Notice in screen 3200, the user has clicked on subview frame 3214 "New Subview Frame 1" and the parameters for "New Subview Frame 1" appear in editor 3216. These parameters can then be altered to refine the appearance of the view which will appear in subview frame 3214.

Views can then be associated with subview frame, 3214. By clicking on subview frame 3214 a screen may be presented to the user to allow a user to select a view to be presented in subview frame 3214. FIG. 33 depicts one embodiment for such a screen. Screen 3300 presents a list of the available views from which the user can select. A user can then select one of these views screen for display in subframe view 3214. Notice in screen 3300 the user has selected the view "Subview" for display in subframe 3214.

If the subview selected is searchable by a criterion, or utilizes a criterion, the user may then be presented with a screen allowing the user to map the field to be searched for the criterion in the subview to a field in the parent view. Thus, the subview may display data associated with a criterion mapped from the parent view. One embodiment for a screen of this type is depicted in FIG. 34. Notice that in screen 3400 the field "CUSTOMER" in the parent view "SAP Customer List" is mapped to "CustomerNo for Subview" in the subview "Subview" assigned to subview frame 3214.

Once subviews are defined for the master view (STEP 340) the composite view can be interacted with. During interaction with the master view, the data displayed by the subviews may depend on the interaction with the master view. This interaction may initiate the passing of a criterion from the master view to subviews of the master view based on a mapping between the fields of the master view and each subview, these subviews may display data associated with the criterion and pass the criterion to their subviews based on a mapping between the fields of each subview and its respective subviews.

Figure 35:
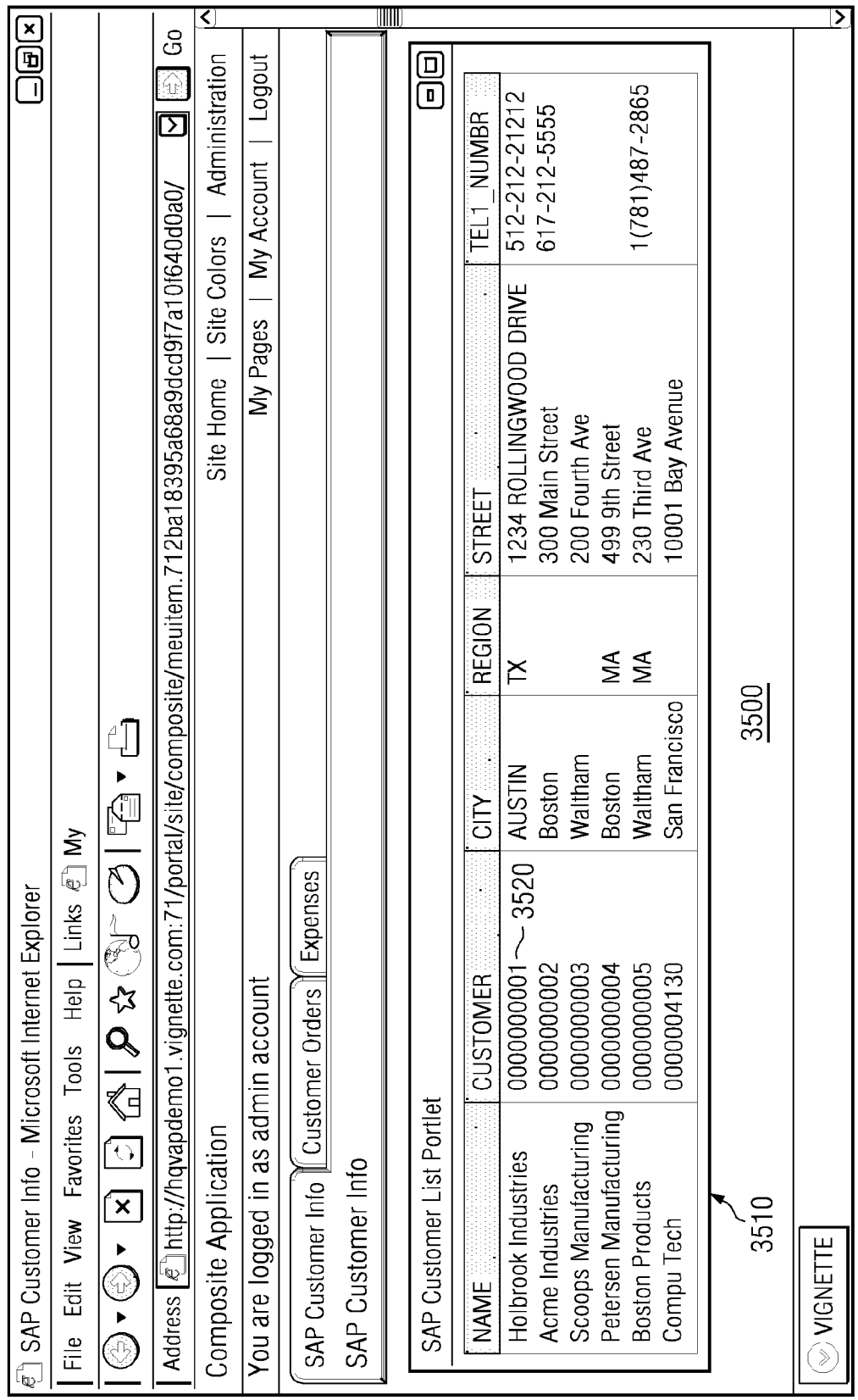
Figure 36:
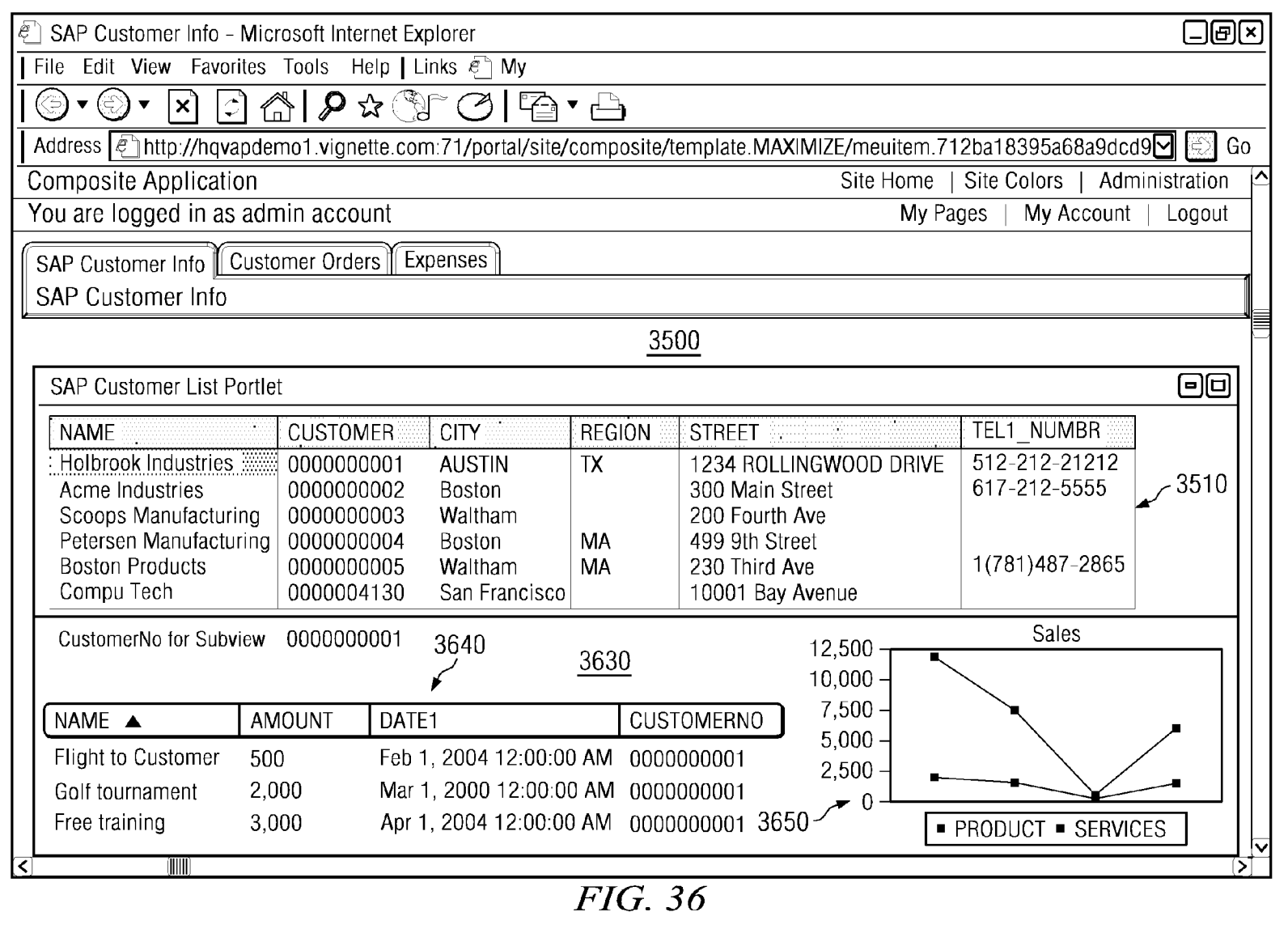

An example of this interaction is depicted in FIGS. 35-37. FIG. 35 depicts one embodiment of an initial presentation of a composite view to a user of the composite view. In the initial presentation of a composite view 3500, only data associated with master view 3510 may be displayed. Based on interaction with the master view 3510, certain data may be displayed in subviews associated with master view 3510. For example, a user of composite view 3500 may select customer "0000000001" 3520. Based on the selection of this customer number data may displayed.

FIG. 36 depicts one embodiment of the display of composite view 3500 based on the selection of customer "0000000001" 3620. Base on the selection of customer "0000000001", subview 3630 of master view 3510 may display the customer number, subviews 3640 and 3650 of subview 3630 may in turn display sales data associated with customer "0000000001" from different data sources, subview 3640 in report form and subview 3650 in chart form. A user interacting with composite view 3500 may then desire data on a different customer and select customer "0000000002" in master view 3510 of composite view 3500.

FIG. 37 depicts one embodiment of the display of composite view 3500 based on the selection of customer "0000000002". Base on the selection of customer "0000000002", subview 3630 of master view 3510 may display the customer number; subviews 3640 and 3650 of subview 3630 may in turn display sales data associated with customer "0000000002" from different data sources, subview 3640 in report form and subview 3650 in chart form. As can be seen then, by interacting solely with master view 3510 of composite view 3500 a wide variety of associated data from a variety of different data sources may be presented to users in a whole host of different formats.

Note that not all of the subview, views, graphical applications or screens are necessary, that subview, views, types of subviews, screens etc. may be added in addition to those illustrated. Additionally, the order in which each of the activities is listed is not necessarily the order in which they are performed. After reading this specification, a person of ordinary skill in the art will be capable of determining which views, screens and orderings best suit any particular objective.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for aggregating and displaying data from a plurality of data sources, comprising:
    creating, by a computer, data models based on the plurality of data sources, the plurality of data sources storing data according to a variety of formats defining different data source fields, the data models containing data model fields corresponding to the different data source fields of the plurality of data sources, wherein the data model fields are user-selected.
    creating, by the computer, views based on a set of view fields, wherein the set of view fields are user-selected, each view field in the set of view fields corresponding to a data model field in one of the data models, one or more view fields of the set of view fields designated as searchable;
    creating, by the computer, a composite view utilizing the views, the composite view configured to display related data from different data sources of the plurality of data sources through the data model fields of the data models in a substantially similar format, regardless of the variety of formats of the plurality of data sources, the composite view including a master view and at least one subview from the views, the creating including:
        designating a view field in the master view as searchable by a criterion;
        designating a view field in the at least one subview as searchable by the criterion; and
        mapping the view field in the master view that is designated as searchable by the criterion with the view field in the at least one subview that is also designated as searchable by the criterion,
        the searchable view field in the master view associated with data source fields from different data sources via data model fields such that a user interaction with the searchable view field in the master view causes display of the at least one subview or a change thereto based at least in part on data obtained from the different data sources using the data model fields and the data source fields; and
    sending the composite view to a user device.

2. The method according to claim 1, wherein the at least one subview includes a first subview and a second subview and user interaction with a field in the first subview causes a change to the second subview.

3. The method according to claim 1, wherein the composite view is configured to be altered entirely based on interaction with the master view such that a user is prevented from having to manually mine the different data sources for the related data.

4. The method according to claim 1, wherein the mapping allows the master view and the at least one subview to display the related data from the different data sources regardless of format of the different data sources or data models on which the master view and the at least one subview are based.

5. The method according to claim 1, wherein the views exist independent of one another and independent of the composite view.

6. The method according to claim 1, further comprising:
   generating, by the computer, one or more additional composite views utilizing the views.

7. The method according to claim 1, wherein the views comprise a chart, a form, a report, or a combination thereof.

8. A computer program product for aggregating and displaying data from a plurality of disparate data sources, the computer program product comprising at least one non-transitory computer readable medium storing instructions translatable by at least one processor to perform:
   creating data models based on the plurality of data sources, the plurality of data sources storing data according to a variety of formats defining different data source fields, the data models containing data model fields corresponding to the different data source fields of the plurality of data sources, wherein the data model fields are user-selected.
   creating views based on a set of view fields, wherein the set of view fields are user-selected, each view field in the set of view fields corresponding to a data model field in one of the data models, one or more view fields of the set of view fields designated as searchable;
   creating a composite view utilizing the views, the composite view configured to display related data from different data sources of the plurality of data sources through the data model fields of the data models in a substantially similar format, regardless of the variety of formats of the plurality of data sources, the composite view including a master view and at least one subview from the views, the creating including:
      designating a view field in the master view as searchable by a criterion;
      designating a view field in the at least one subview as searchable by the criterion; and
      mapping the view field in the master view that is designated as searchable by the criterion with the view field in the at least one subview that is also designated as searchable by the criterion, the searchable view field in the master view associated with data source fields from different data sources via data model fields such that a user interaction with the searchable view field in the master view causes display of the at least one subview or a change thereto based at least in part on data obtained from the different data sources using the data model fields and the data source fields; and
   sending the composite view to a user device.

9. The computer program product of claim 8, wherein the at least one subview includes a first subview and a second subview and user interaction with a field in the first subview causes a change to the second subview.

10. The computer program product of claim 8, wherein the composite view is configured to be altered entirely based on interaction with the master view such that a user is prevented from having to manually mine the different data sources for the related data.

11. The computer program product of claim 8, wherein the mapping allows the master view and the at least one subview to display the related data from the different data sources regardless of format of the different data sources or data models on which the master view and the at least one subview are based.

12. The computer program product of claim 8, wherein the views exist independent of one another and independent of the composite view.

13. The computer program product of claim 8, wherein the instructions are further translatable by the at least one processor to perform:
   generating one or more additional composite views utilizing the views.

14. The computer program product of claim 8, wherein the views comprise a chart, a form, a report, or a combination thereof.

15. A system for aggregating and displaying data from a plurality of data sources, comprising:
   at least one processor; and
   at least one non-transitory computer readable medium storing instructions translatable by the at least one processor to perform:
   creating data models based on the plurality of data sources, the plurality of data sources storing data according to a variety of formats defining different data source fields, the data models containing data model fields corresponding to the different data source fields of the plurality of data sources, wherein the data model fields are user-selected;
   creating views based on a set of view fields, wherein the set of view fields are user-selected, each view field in the set of view fields corresponding to a data model field in one of the data models, one or more view fields of the set of view fields designated as searchable;
   creating a composite view utilizing the views, the composite view configured to display related data from different data sources of the plurality of data sources through the data model fields of the data models in a substantially similar format, regardless of the variety of formats of the plurality of data sources, the composite view including a master view and at least one subview from the views, the creating including:
      designating a view field in the master view as searchable by a criterion;
      designating a view field in the at least one subview as searchable by the criterion; and
      mapping the view field in the master view that is designated as searchable by the criterion with the view field in the at least one subview that is also designated as searchable by the criterion, the searchable view field in the master view associated with data source fields from different data sources via data model fields such that a user interaction with the searchable view field in the master view causes display of the at least one subview or a change thereto based at least in part on data obtained from the different data sources using the data model fields and the data source fields; and sending the composite view to a user device.

16. The system of claim 15, wherein the at least one subview includes a first subview and a second subview and user interaction with a field in the first subview causes a change to the second subview.

17. The system of claim 15, wherein the composite view is configured to be altered entirely based on interaction with the master view such that a user is prevented from having to manually mine the different data sources for the related data.

18. The system of claim 15, wherein the mapping allows the master view and the at least one subview to display the related data from the different data sources regardless of format of the different data sources or data models on which the master view and the at least one subview are based.

19. The system of claim 18, wherein the views exist independent of one another and independent of the composite view.

20. The system of claim 15, wherein the instructions are further translatable by the at least one processor to perform:
    generating one or more additional composite views utilizing the views.

21. The system of claim 15, wherein the views comprise a chart, a form, a report, or a combination thereof.

* * * * *